United States Patent [19]

Togawa

[11] Patent Number: 6,038,585

[45] Date of Patent: *Mar. 14, 2000

[54] AUTONOMOUS DISTRIBUTED INSTRUCTION BOOK CONTROL DEVICE

[75] Inventor: Yoshifusa Togawa, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,710

[22] Filed: Dec. 22, 1995

[30] Foreign Application Priority Data

Mar. 27, 1995 [JP] Japan ...................................... 7-067498

[51] Int. Cl.[7] .................................................... G06F 9/00
[52] U.S. Cl. ........................................... 709/100; 709/104
[58] Field of Search ..................................... 395/672, 673, 395/675; 709/100, 102, 103, 105, 300

[56] References Cited

U.S. PATENT DOCUMENTS

| | | |
|---|---|---|
| 4,570,217 | 2/1986 | Allen et al. |
| 4,590,555 | 5/1986 | Bourrez .................................... 364/200 |
| 4,633,385 | 12/1986 | Murata et al. ........................... 364/191 |
| 5,434,970 | 7/1995 | Schiffleger ............................... 709/213 |
| 5,509,129 | 4/1996 | Guttag et al. ............................ 712/203 |
| 5,526,487 | 6/1996 | Schiffleger .................................. 710/1 |
| 5,701,484 | 12/1997 | Artsy . |
| 5,838,906 | 11/1998 | Doyle et al. ............................ 709/202 |

FOREIGN PATENT DOCUMENTS 5-197694  6/1993  Japan .

OTHER PUBLICATIONS

"Inside Windows NT" Helen Custer, Microsoft Press, 1993.

Danneberg et al., "A Butler Process for Resource Sharing On Spice Machines", ACM Transactions on Office Information Systems, vol. 3, No. 3, pp. 234–252, Jul. 1985.

*Primary Examiner*—Majid A. Banankhah
*Attorney, Agent, or Firm*—Staas & Halsey LLP

[57] ABSTRACT

An autonomous distributed instruction book control device executes target processes while an instruction book which contains data pertaining to a processing procedure is transmitted among a plurality of processors having processing units. An input/output unit inputs a creation request of the instruction book and inputs and outputs processing requests to the instruction book. An instruction book control unit creates the instruction book through input of a creation request from the input/output unit, inputs the processing request to the instruction book, and outputs the processing result for the processing request through the input/output unit. An instruction book management unit manages the instruction book notified from the instruction book control unit. An instruction book processing unit transmits the instruction book, which moves among the plurality of processors, activates the processing units in a target processor selected from the plurality of processors for executing the target process in accordance with the processing procedure described in the instruction book and holds the processing results which have been processed by the processing units of the target processor, and notifies the instruction book control unit of the processing results.

12 Claims, 17 Drawing Sheets

FIG. 2

INSTRUCTION BOOK OPERATION SEQUENCE : 80, 81

```
start : creat
        INPUT (PADDING PROCESS PROCEDURE 1)
        EXEC  (PADDING PROCESS PROCEDURE 2)
        LOOP start
            :
```

INSTRUCTION BOOK OPERATION COUNT : 82

| F | PROCESSOR NO. | COUNT | PROCESSOR NO. | COUNT | ... |
|---|---|---|---|---|---|

PADDING PROCESSING DATA : 83

| T1 | TASK NAME | T2 | RESULT STORAGE AREA | NEXT TASK POINTER | T3 | EXECUTABLE PROGRAM NAME | PARAMETER |
|---|---|---|---|---|---|---|---|
| : | : | : | : | : | : | : | : |

TARGET LIMITATION DATA : 84

| LIMITATION PRIORITY | T4 | LIMITATION CONDITION | T3 | EXECUTABLE PROGRAM NAME | PARAMETER |
|---|---|---|---|---|---|
| : | : | : | : | : | : |

INSTRUCTION BOOK DELETE CONDITION : 85

| DELETE CONDITION PRIORITY | T6 | DELETE PERIOD, COUNT, KEYWORD, ETC. | STATUS |
|---|---|---|---|
| : | : | : | : |

INSTRUCTION BOOK ACCUMULATION INSTRUCTION DATA : 86

| ACCUMULATION INSTRUCTION PRIORITY | T7 | ACCUMULATION TRIGGER | T3 | ACCUMULATION PROGRAM NAME | PARAMETER |
|---|---|---|---|---|---|
| : | : | : | : | : | : |

INSTRUCTION BOOK USE ENVIRONMENT LIMITATION DATA : 87

| SYSTEM NAME | CPU NAME | I/O NAME |
|---|---|---|
| : | : | : |

FIG. 3

| | | | | | 32 |
|---|---|---|---|---|---|
| INSTRUCTION BOOK STATUS : | | | | | 33 |
| TAG | INSTRUCTION BOOK ID | TAG | PASSWORD | INSTRUCTION BOOK LOCATION | |
| | | | | | |
| ⋮ | ⋮ | ⋮ | ⋮ | ⋮ | |

INSTRUCTION BOOK STORAGE AREA : 34

| PROCESSOR DATA : | | | | | 35 | |
|---|---|---|---|---|---|---|
| PROCESSOR | ENVIRONMENT CONDITIONS | FREE | OPERATION STATUS | NUMBER OF INSTRUCTION BOOKS | INSTRUCTION BOOK ID | ⋯ |
| | | | | | | |
| ⋮ | ⋮ | ⋮ | ⋮ | ⋮ | ⋮ | ⋮ |

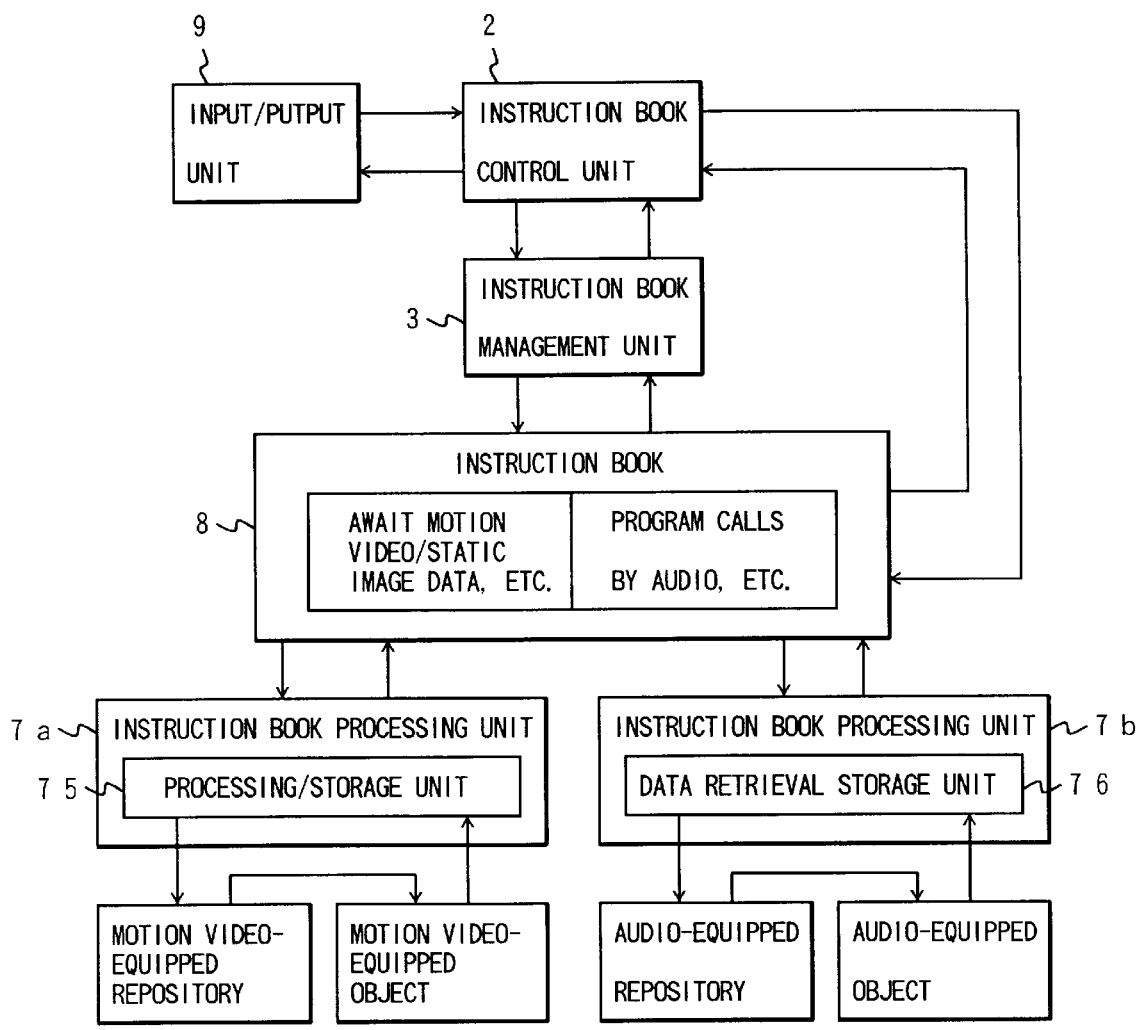

AUTONOMOUS DISTRIBUTED INSTRUCTION BOOK CONTROL DEVICE

BACKGROUND OF THE INVENTION

1. Field of the Invention

The present invention relates to an autonomous distributed instruction book control device for executing target processes by an instruction book in an environment such as a network, distributed system, distributed object-oriented system, or integrated network.

2. Background of the Invention

In recent years, demands for computer systems of lower cost and higher speed have been accompanied by the increasing importance of processing in distributed environments such as multiprocessor and network environments. In such distributed computing environments, the external environment tends to change, so that situations which cannot be responded to solely by fixed processing procedures designed beforehand tend to arise. It is therefore necessary for the system to be capable of autonomously modifying processing procedures in order to respond flexibly to changes in external conditions and the like.

For example, in conventional network environments, necessary data is stored in files or databases. This is accomplished by running the desired processing commands, application software, or the like. The files are read or the database is searched each time a task requires it.

In contrast, in distributed computing environments, it is sometimes uncertain where the necessary data which has been placed in file or database is located. In such cases, it is necessary to search for the necessary data, so that retrieving data for use entails significant effort.

In addition, real-time updating and processing of necessary data is very time-consuming, making it impossible to achieve high-speed processing.

With regard to retrieval of and processing adapted to unanticipated data, which falls outside ordinary data, it is necessary in distributed systems to constantly monitor the occurrence of unanticipated data.

For the foregoing reasons, it is difficult in the prior art to perform real-time processing of necessary data in distributed computing environments. With regard to processing unanticipated data, one method is to estimate anticipated processing procedures to a certain extent as a preparatory measure. Due to various restrictions and conditions, data checks are difficult in this method as well.

Another method involves the use of scripts to describe tasks for non-standard execution. But it is nearly impossible to represent all possible conditions.

SUMMARY OF THE INVENTION

An object of the first embodiment of the present invention to provide an autonomous distributed instruction book control device which constantly monitors, without accessing, unanticipated data, constantly changing data, or restricted or conditional data to sequentially execute a target process by using a processing unit suited to the particular target process, and which employs an autonomous processing instruction book in accordance with the above-mentioned procedure or data as the transaction for sequentially executing the target process.

An object of the second embodiment of the present invention is to provide an autonomous distributed instruction book control device that can adapt to unanticipated conditions by furnishing the instruction book with an automatically updated instruction-adding function.

An object of the third embodiment of the present invention is to provide an autonomous distributed instruction book control device that is capable of guarding activities other than the instructions for performing the necessary processing.

The autonomous distributed instruction book control device which pertains to the present invention is provided with an input/output unit, an instruction book control unit, an instruction book management unit, and an instruction book processing unit. The autonomous distributed instruction book control device executes a target process while transmitting an instruction book, which contains information pertaining to processing procedure, among a plurality of processors having a processing unit.

The input/output unit inputs a creation request of the instruction book, and inputs and outputs a processing request to the instruction book. The instruction book control unit creates an instruction book by inputting a creation request from the input/output unit, inputs the processing request to the instruction book, and outputs a processing result in response to the processing request through the input/output unit.

The instruction book management unit manages the instruction book notified from by the instruction book control unit. The instruction book processing unit transmits the instruction book, which moves between the plurality of processors, activates the processing unit in a target processor selected from among the plurality of processors in order to execute the target process in accordance with the processing procedure described in the instruction book, holds the results of processing by the processing unit in the target processor, and notifies the processing results to the instruction book control unit.

The instruction book processing unit is provided with a plurality of processing units for executing a plurality of target processes, and a monitoring unit for monitoring the instruction book and activating the plurality of processing units by sending messages to one an object or a program to be executed on the basis of the processing procedures contained in the instruction book.

The device is also provided with an instruction book procedure-adding a unit for adding new processing procedure to the instruction books.

Instruction books have an area for padding processes which stores at least one from among task names updated in response to processing and environment, a task result storage area, and names of executable programs for executing tasks. The instruction book processing unit references the area for padding processes in an updated instruction book when determining which of the processes of the tasks is to be executed next.

The device is also provided with an instruction book minimum operation extraction unit for extracting the minimum search route for retrieving data stipulated by the instruction book and for reconfiguring the processing procedure so that instruction book searches are conducted with minimum operation.

The device is also provided with an instruction book operation verification unit for verifying in advance the validity of operation pertaining to a new processing procedure added to the instruction book by the instruction book procedure-adding unit.

The device is also provided with an instruction book operation verification unit for verifying in advance the validity of an operation pertaining to a reconfigured processing procedure when the processing procedure has been reconfigured by the instruction book minimum operation extraction unit.

The instruction book is also provided with an area for storing an instruction book deletion condition which relies on at least one from among delete period, number of executions, and keywords. The instruction book is automatically deleted when the instruction book deletion conditions stored in the instruction book are met.

The instruction book also has an area for storing accumulation instruction data, including accumulation triggers pertaining to an occasion for accumulating predetermined data and information pertaining to accumulation programs. The instruction book processing unit is provided with an accumulation unit that takes an accumulation trigger as an occasion for running an appropriate accumulation program.

Assuming the provision of processors A and B, the present invention has the following effect. When the optimal processor required for a particular process on the basis of a processing procedure in the instruction book is processor A, the instruction book processing unit notifies a processing request to processor A in accordance with the processing procedure in the instruction book, and requests processing by the processing unit in the processor A internal environment. The instruction book control unit receives the processing results and writes the processing results to the instruction book.

When the processor required for the next process of the processing procedure is processor B, the instruction book processing unit notifies a processing request to processor B in accordance with the processing procedures in the instruction book, and requests processing by the processing unit. The instruction book control unit receives the processing results.

The processing results contained in the instruction book at completion of the processing procedure can be fetched by the input/output unit.

In the event that, due to change in the environment within a processor, it becomes necessary to add a processing procedure other than processing procedures described in the instruction book, the instruction book procedure-adding unit adds a new processing procedure, and is thus able to flexibly adapt to changes in the environment.

The instruction book minimum operation extraction unit extracts the minimum operation required for a search or the like from among the processing procedures described in the instruction book, so processing procedures in the instruction book can be executed efficiently.

When instruction book processing procedures have been modified by the instruction book procedure-adding unit and the instruction book minimum operation extraction unit, the instruction book operation verification unit conducts verification of normal operation free from endless loops and the like.

The instruction book management unit manages data pertaining to the instruction book, such as the location of the instruction book which moves among the processors, so that proper processing can be executed.

BRIEF DESCRIPTION OF THE DRAWINGS

FIG. 2 is a diagram depicting an example of table structure in the instruction book in a preferred embodiment;

FIG. 3 is a diagram depicting an example of instruction book management data table structure in a preferred embodiment;

FIG. 13 is a diagram depicting instruction book processing adapted to multimedia, such as motion video, audio, and static images, in a preferred embodiment;

DESCRIPTION OF THE PREFERRED EMBODIMENTS

Figure 1:
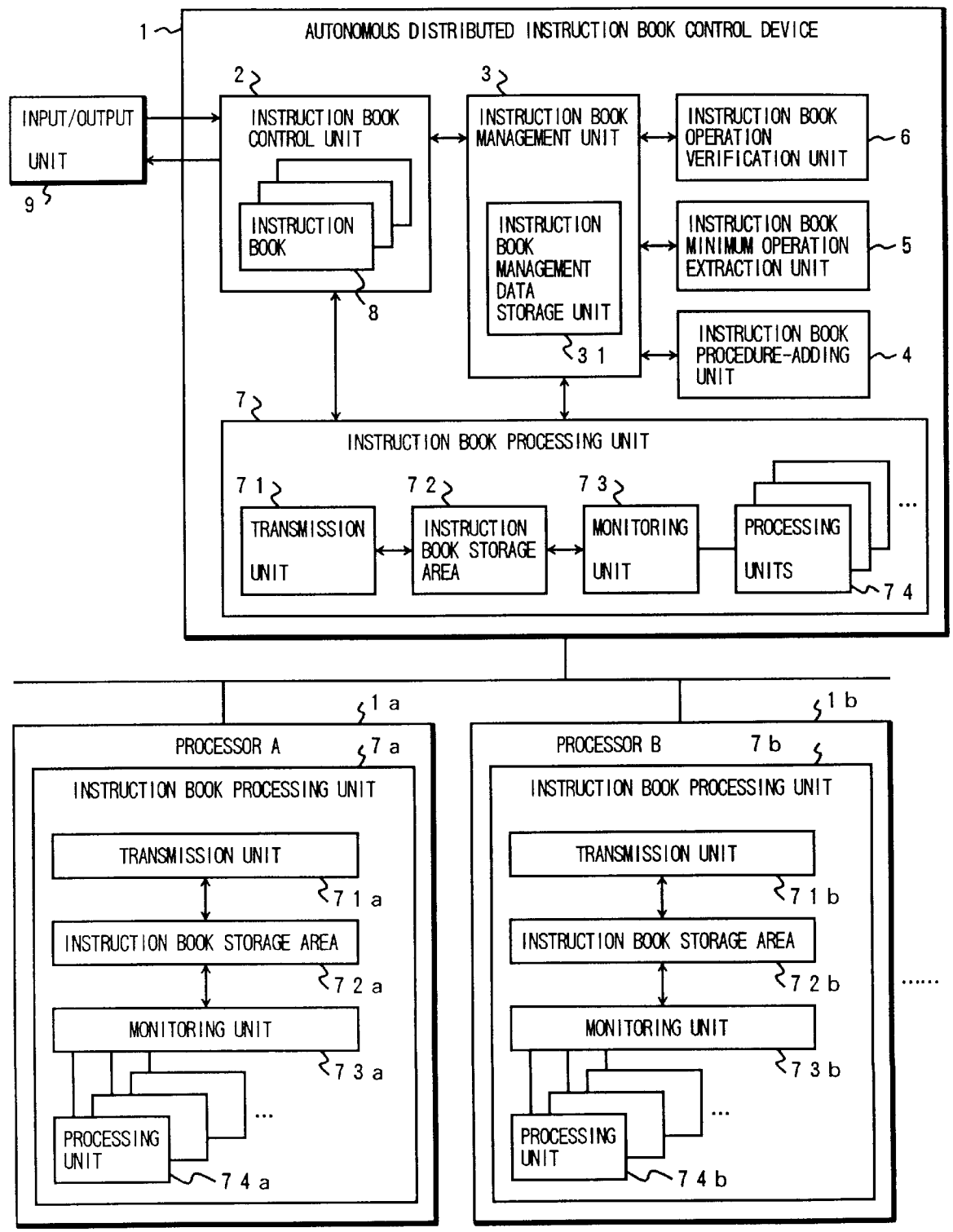
FIG. 1 is a diagram depicting the basic structure in the present invention.

A preferred embodiment of the autonomous distributed instruction book control device which pertains to the present invention will be described with reference to the drawings. FIG. 1 depicts the structure of a computer system containing an autonomous distributed instruction book control device in accordance with the first preferred embodiment of the present invention.

In FIG. 1, the computer system is provided with an input/output unit 9, an autonomous distributed instruction book control device 1 connected to the input/output unit 9, and a plurality of processors 1a, 1b . . . .

The autonomous distributed instruction book control device 1 is provided with an instruction book control unit 2, an instruction book management unit 3, an instruction book procedure-adding unit 4, an instruction book minimum operation extraction unit 5, an instruction book operation verification unit 6, and an instruction book processing unit 7. The input/output unit 9 is a keyboard or display.

The autonomous distributed instruction book control device 1 is connected to a plurality of processors 1a, 1b, . . . through a network. The autonomous distributed instruction book control device 1 can be located at any single processor in a distributed system; a single device or a plurality of devices can be provided.

The instruction book control unit 2 creates an instruction book 8 through input from the input/output unit 9, and performs control through the instruction book management unit 3 and the instruction book processing unit 7 in order to fetch data from the instruction book 8.

The instruction book 8 contains processing procedures, processing instruction data, data used in processing procedures, data for managing these data, and the like. The instruction book 8 stores, for example, task operation sequences, operation counts, target limitation data, deletion conditions, accumulation instructions, use environment controls, and other data.

On the basis of processing procedure data stored in the autonomous instruction book in the environment of the optimal processor for obtaining a target result (for example, processor A), the instruction book 8 performs processing in the processing units 74 via the monitoring unit 73 of the instruction book processing unit 7.

The instruction book management unit 3 manages the location, etc., of the instruction book 8 through an instruction book management data table containing data such as instruction book ID and password data. The instruction book management unit 3 performs (via the instruction book procedure-adding unit 4, the instruction book minimum operation extraction unit 5, and the instruction book operation verification unit 6) data retrieval by means of processing operations that are optimal for the processing procedure described in the instruction book 8, and performs verification and the like of data stored in the instruction book 8. The instruction book management unit 3 has an instruction book management data storage unit 31; the instruction book management data storage unit 31 stores an instruction book management data table.

The instruction book procedure-adding unit 4 adds new processing procedures to the instruction book 8. The instruction book minimum operation extraction unit 5 extracts the minimum search route or the like required to perform, for example, a search or other process with reference to data or conditions from the instruction book 8, and reconfigures the processing procedure so that execution of the search or the like by the instruction book 8 can be executed with minimum operation.

The instruction book operation verification unit 6 checks whether the instruction book 8 is executing the target operation. If the processing procedure has been modified by adding a new processing procedure or by partial reconfiguration of processing procedure by the processing procedure action of the instruction book 8, the instruction book operation verification unit 6 verifies the validity of the new processing procedure.

The instruction book processing unit 7 has a transmission unit 71, an instruction book storage area 72, a monitoring unit 73, and processing units 74. The instruction book processing unit 7 performs target processes on the basis of the processing procedures stored in the instruction book 8, which is stored in the instruction book storage area 72. The instruction book processing unit 7 can be located in a multiprocessor environment, a network environment, or a distributed object environment.

The transmission unit 71 transmits the instruction book 8 among the various processors and the autonomous distributed instruction book control device 1. The instruction book storage area 72 is the area for storing the instruction book 8. The monitoring unit 73 monitors whether the instruction book 8 is present in the instruction book storage area 72, discriminates requests by the instruction book 8, distributes processing tasks to the corresponding processing units 74, and performs other control and data exchange tasks between the instruction book 8 and the processing units 74.

The processing units 74 perform the actual processes, for example, processing/storage, data exchange/storage, searches, accumulation, classification, and the like, on the basis of the instruction book 8. The processing units 74 comprises repositories (management data for objects and the like), objects (programs and the like), and other items necessary for processing. The repositories and objects may be parallel or hierarchical. These objects can be objects which become operative by message-passing through object orientation.

The input/output unit 9 performs input/output for a keyboard, speaker, display, mike, or other device; the user fetches the data settings of the instruction book 8, the processing results in the instruction book 8, or the like.

The processor 1a has an instruction book processing unit 7a, and the processor 1b has an instruction book processing unit 7b. The instruction book processing unit 7a is provided with a transmission unit 71a, an instruction book storage area 72a, a monitoring unit 73a, and processing units 74a. The instruction book processing unit 7b is provided with a transmission unit 71b, an instruction book storage area 72b, a monitoring unit 73b, and processing units 74b.

Basic operation will now be described. When the optimal processor required for a particular process on the basis of a processing procedure in the instruction book 8 is processor A, instruction book 8 first notifies a processing request to processor A. The instruction book control unit 2 makes a request for processing to the processing unit 74 through the monitoring unit 73 in the processor A environment and receives the processing results; these processing results are written to a table in the instruction book 8.

When the optimal processor required for the next processing procedure is processor B, instruction book 8 notifies a processing request to processor B. The processor shifts from processor A to processor B, and the instruction book control unit 2 makes a request for processing and receives the processing results, as above.

When this processing procedure has been completed, the processing results listed in the instruction book 8 can be fetched by the input/output unit 9.

FIG. 2 is a diagram depicting an example of table structure in the instruction book in a preferred embodiment. An instruction book table 80 is located in the instruction book 8.

As indicated in FIG. 2, the instruction book table 80 stores an instruction book operation sequence 81, instruction book operation counts 82, padding processing data 83, target limitation data 84, instruction book deletion conditions 85, instruction book accumulation instruction data 86, instruction book use environment limitation data 87, and other data.

As indicated in the drawing, the instruction book operation sequence 81 stores a processing operation sequence comprising data such as commands, conditional loops, processing operation procedures during synchronization wait (WAIT) by the processor in parallel processing, operation instructions pertaining to a timer, count-initiated delete sequences, and the like. The instruction book operation counter 82 holds count data for a number of actions of each processor related to the instruction book 8. This is used to perform checks such as endless loop checks.

The padding processing data 83 stores task names for padding processing, process result storage areas, pointers indicating subsequent tasks, executable program names (object names), parameters, and the like. The target limitation data 84 stores limitation priority, limitation conditions, executable program names (object names), and the like. The instruction book deletion conditions 85 store deletion condition priority, expiration period, count, keywords, and other deletion trigger data and status information.

The instruction book accumulation instruction data 86 stores accumulation instruction priority, accumulation triggers, accumulation program names (object names), parameters, and the like. The instruction book use environment limitation data 87 stores the name of the system for executing processing procedures in the instruction book 8, the CPU name, I/O name, and the like.

FIG. 3 is a diagram depicting an example of instruction book management data table structure. The instruction book management data table 32 depicted in FIG. 3 is a table stored in the instruction book management data storage unit 31 managed by the instruction book management unit 3. The instruction book management data table 32 has areas for storing instruction book status 33 indicating instruction book IDs uniformly given to each instruction book or IDs pertaining to resources used by an instruction book, passwords for checking the usage right of an instruction book, instruction book location, and the like.

The instruction book management data table 32 has an instruction book storage area 34 for storing the instruction book 8 currently managed by the instruction book management unit 3, and an area for data such as data 35 for each processor, comprising environmental conditions for each processor, whether a processor is free or not, instruction book operation conditions in each processor, number of instruction books, instruction book IDs, and the like.

Figure 4:
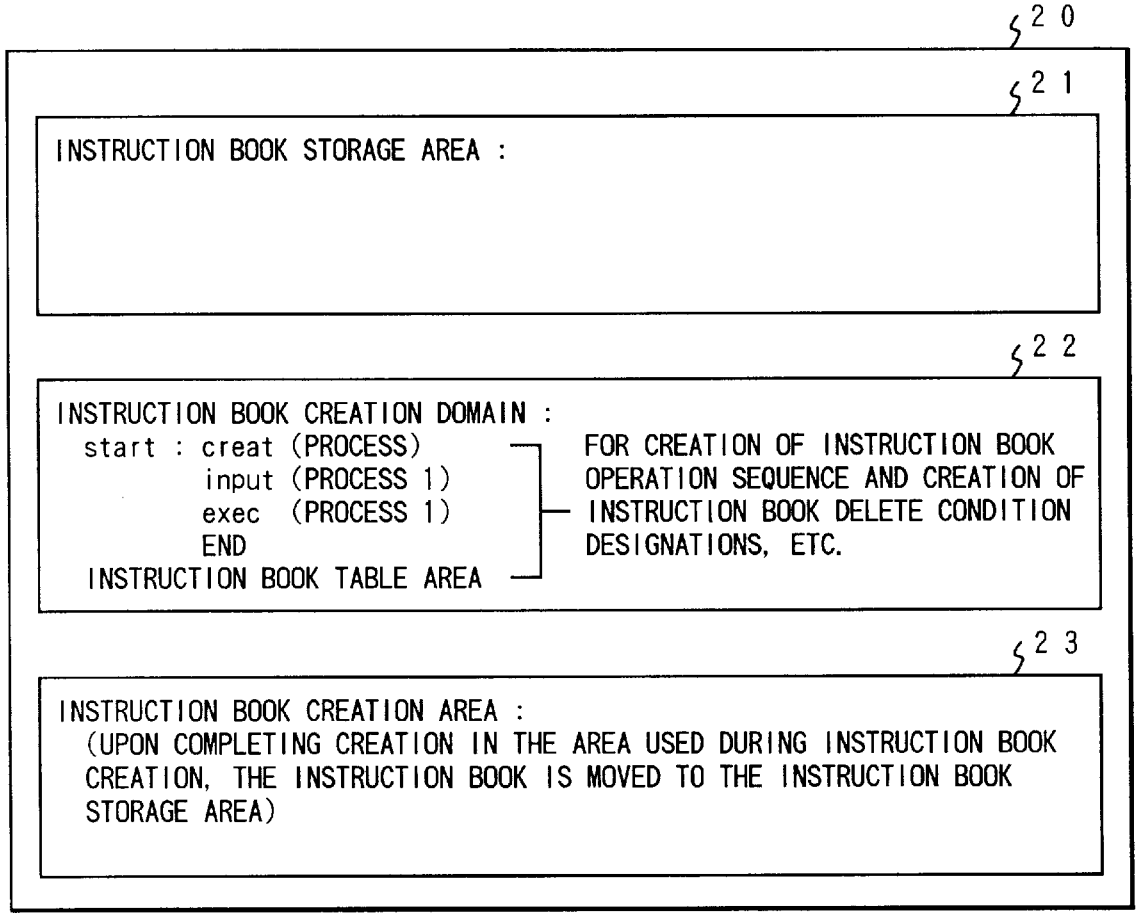
FIG. 4 is a diagram depicting an example of instruction book control unit table structure in a preferred embodiment.

FIG. 4 is a diagram depicting an example of table structure in the instruction book control unit 2.

As indicated in FIG. 4, the table 20 used by the instruction book control unit 2 comprises an instruction book storage area 21, an instruction book creation domain 22 for storing definitions used in creating instruction book operation sequences 81 and instruction book deletion condition 85 instructions, and an instruction book creation area 23. The instruction book creation area 23 is the area used during creation of an instruction book. When creation is complete, the instruction book is moved to the instruction book storage area 21.

Figure 5:
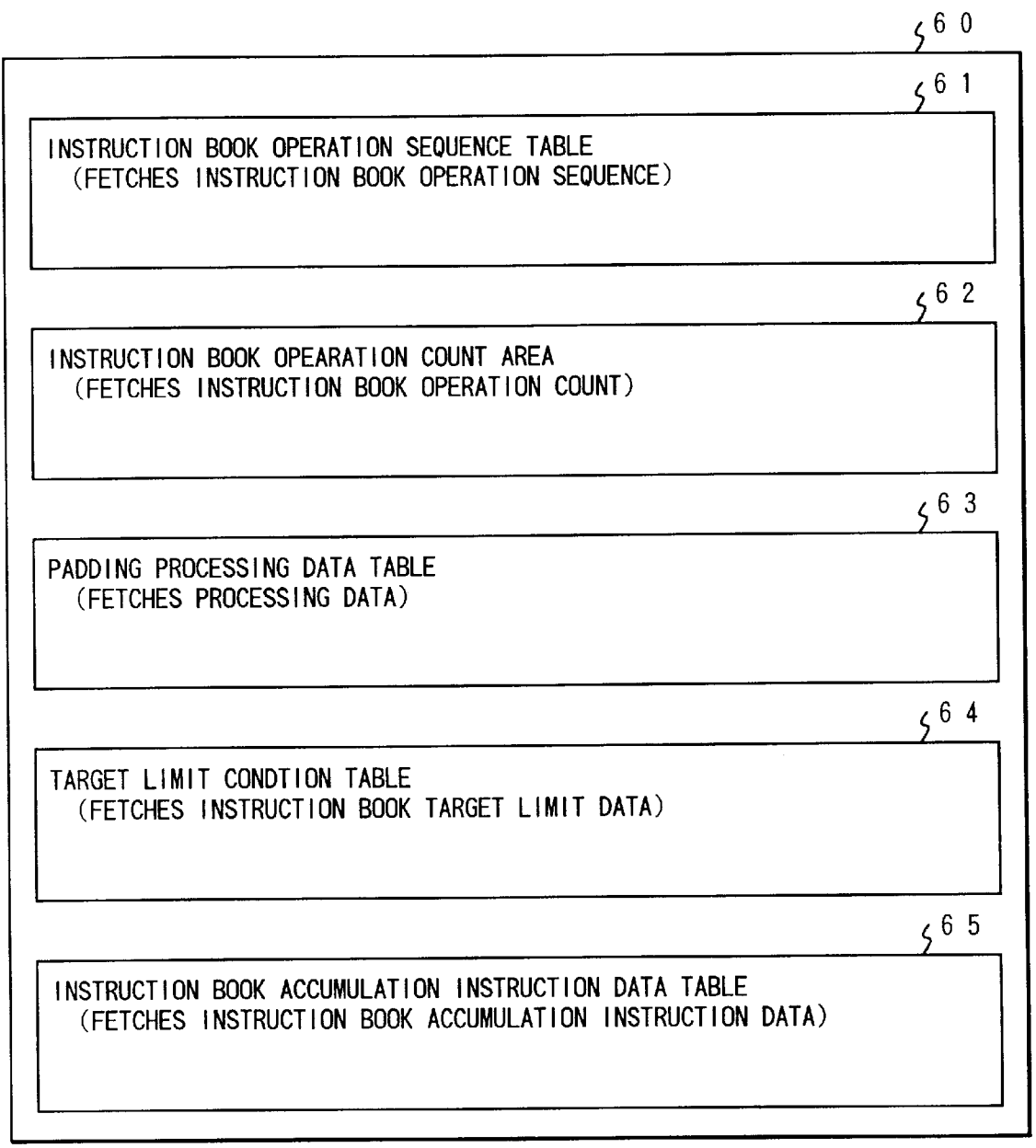
FIG. 5 is a diagram depicting an example of operation verification table structure in a preferred embodiment.

FIG. 5 is a diagram depicting an example of the structure of the operation verification table of the instruction book operation verification unit 6.

As indicated in FIG. 5, the instruction book operation verification table 60 used by the instruction book operation verification unit 6 comprises an instruction book operation sequence table 61 for holding instruction book operation sequences 81 for instruction books, an instruction book operation count area 62 for holding instruction book operation counts 82 for instruction books, a padding processing data table 63 for holding padding processing data 83 for instruction books, a target limitation condition data table 64 for holding target limitation data 84 for instruction books, and an instruction book accumulation instruction data table 65 for holding accumulation instruction data 86 for an instruction book.

Figure 6:
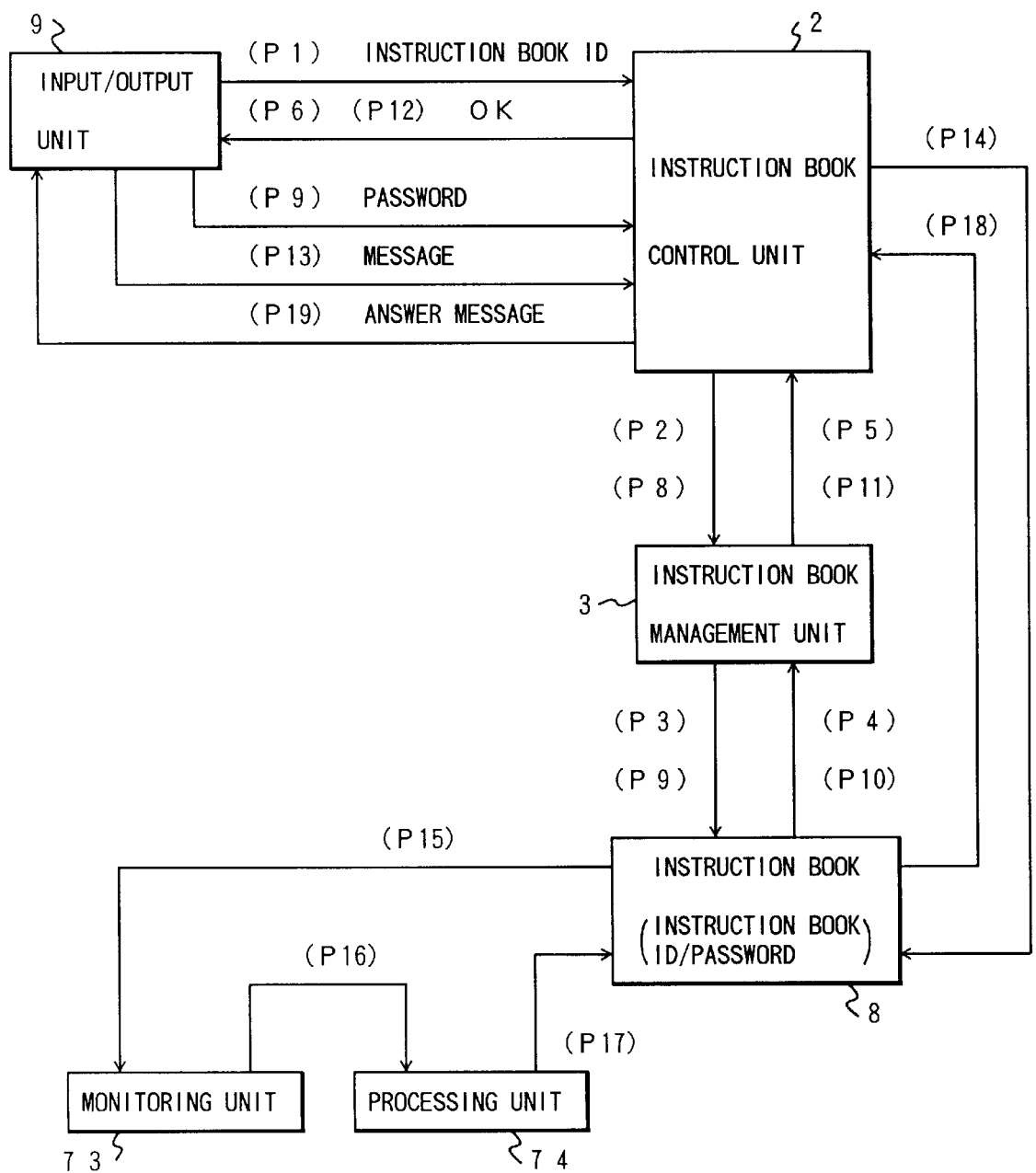
FIG. 6 is a diagram depicting process flow in the case of outputting an input request to the instruction book to obtain processing results.

FIG. 6 is a diagram depicting process flow in the case of outputting an input request to an instruction book to obtain processing results in a preferred embodiment of the present invention. A preferred embodiment will be described below referring to processes (P1) through (P19) indicated in FIG. 6.

When the instruction book control unit 2 is to retrieve data by a database search or the like, the instruction book ID of the instruction book 8 for searching the database is entered from the input/output unit 9 (P1).

The instruction book control unit 2 passes the entered instruction book ID to the instruction book management unit 3 (P2).

The instruction book management unit 3 retrieves for an instruction book 8 to which the passed instruction book ID has been added. When an instruction book 8 is present, the instruction book management unit 3 performs a check of the resources used by the instruction book 8 if necessary, and notifies the results to the instruction book control unit 2 (P3 through P5).

If the specified instruction book ID is useable, the instruction book control unit 2 notifies the user of this fact through the input/output unit 9 and asks for a password (P6).

When a password is then entered from the input/output unit 9, the instruction book control unit 2 notifies the instruction book management unit 3 of the entered password (P7 and P8).

The instruction book management unit 3 transmits the password to the corresponding instruction book 8, and checks whether or not the password is correct. If the password is correct, the instruction book control unit 2 is notified of this fact (P9 through P11).

The instruction book control unit 2 gives an "OK" to the user through the input/output unit 9, and a message indicating the nature of the data to be retrieved is entered by the user through the input/output unit 9 (P12, P13).

The request message is transmitted from the instruction book control unit 2 to the instruction book 8 (P14). The monitoring unit 73 monitors the instruction book 8 and distributes the requested processing tasks transmitted to the instruction book 8 in accordance with the instruction book operation sequence 81, activates the processors 74 in order to retrieve the requested data (P15, P16).

The processors 74 retrieves the requested data and writes the results to the instruction book 8 (P17). If these results are the final processing results, the results are returned to the instruction book control unit 2. These results are then output from the instruction book control unit 2 as an answer message through the input/output unit 9 (P18, P19).

In this way, processing results contained in the instruction book 8 subsequent to completion of the processing procedure can be fetched through the input/output unit 9.

In addition, processing of target data can be accomplished through an instruction book 8 which jumps between processors for performing a single operating instruction.

In addition, instruction books have instruction book IDs and passwords, so an instruction book can be fetched by using the corresponding instruction book ID and password in order to search for target data.

Figure 7A:
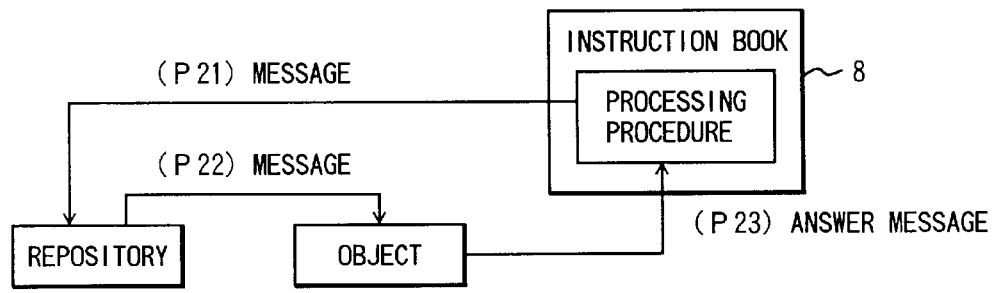
FIG. 7A is a diagram depicting other process flows in a preferred embodiment.

FIG. 7A is a diagram depicting other process flows in a preferred embodiment of the present invention.

In (P21) in FIG. 7A, a message is transmitted to a repository on the basis of the processing procedure described in the instruction book 8. In (P22), the repository passes the message to a designated object, and in (P23), the object executes a process in accordance with the message and returns an answer message with the result of the processing to the processing procedure of the instruction book 8.

Figure 7B:
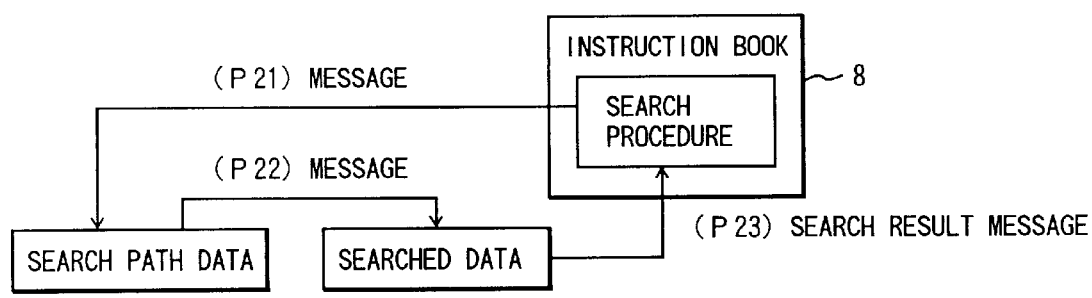
FIG. 7B is a diagram depicting process flow in the case when the processing procedure in the instruction book is a search procedure.

FIG. 7B is a diagram depicting the process flow in the case when the processing procedure in the instruction book 8 is a search procedure. In (P21) in FIG. 7B, a message requesting search path data is transmitted in accordance with the search procedure in the instruction book 8. In (P22), the actual search is carried out with the obtained search path data message, and in (P23), a search result message is returned to the instruction book 8.

In this way, the instruction book 8 sends a message to each object so that data can be processed automatically.

Figure 8:
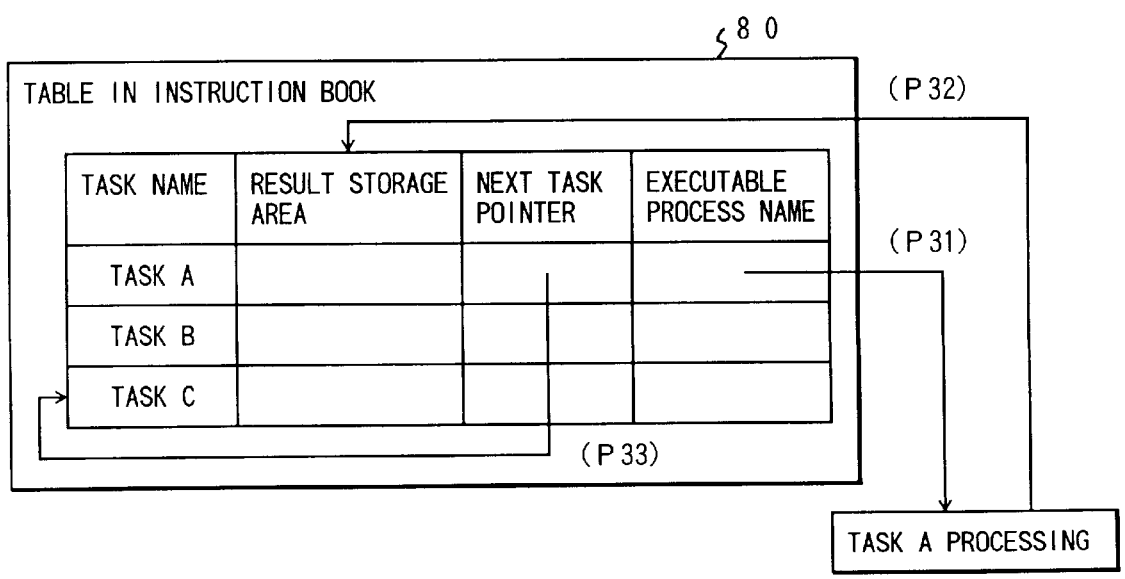
FIG. 8 is a diagram depicting a table in the instruction book in the case when processing proceeds while a padding processing is performed in the instruction book.

FIG. 8 is a diagram depicting a table 80 in the instruction book in the case when processing proceeds while a padding processing is performed in the instruction book.

As indicated in FIG. 8, the instruction book table 80 stores the names of each task (task A, task B, . . . ), a result storage area for each task, pointers for indicating the next task to be executed, and the names of executable programs (or objects) for executing each task. For example, a task A is started in the following way in accordance with the instruction book operation sequence 81.

First, in (P31), the name of the executable program for task A is obtained from the instruction book table 80, and the processing of task A is performed by the object. In (P32), the processing results of task A are stored in the results storage area of the instruction book table 80. In (P33), the next task pointer is fetched by storing the processing results of task A in the results storage area, and task C, which is the task indicated by this next task pointer, is executed.

By updating the next task pointer in accordance with the processing results, the order of tasks can be easily modified. The instruction book itself pads the instruction book in a padded configuration, so that data required can be fetched with reference to the environment and conditions.

Figure 9A:
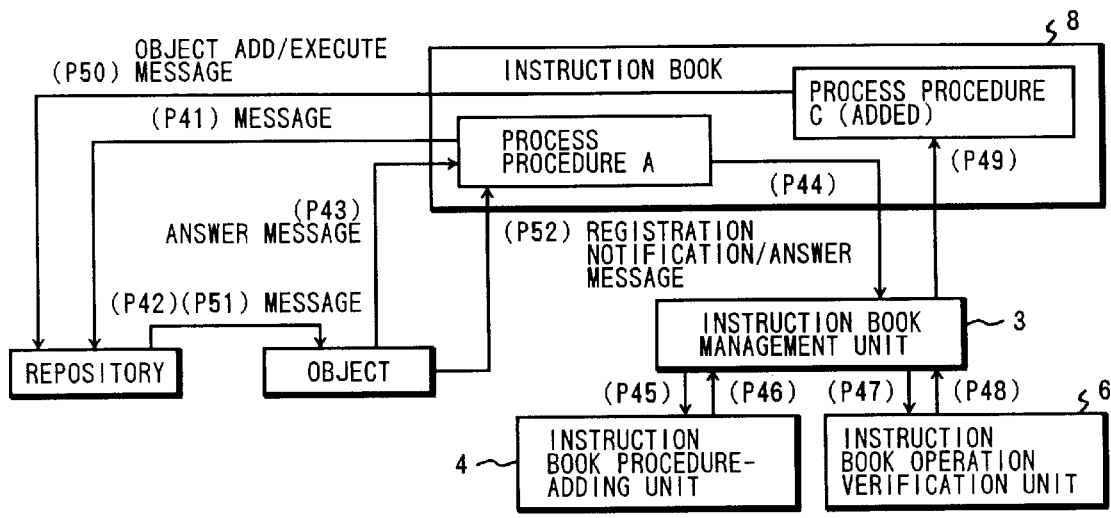
FIG. 9A is a diagram depicting process flow in the case when a processing procedure is added in a preferred embodiment.
Figure 9B:
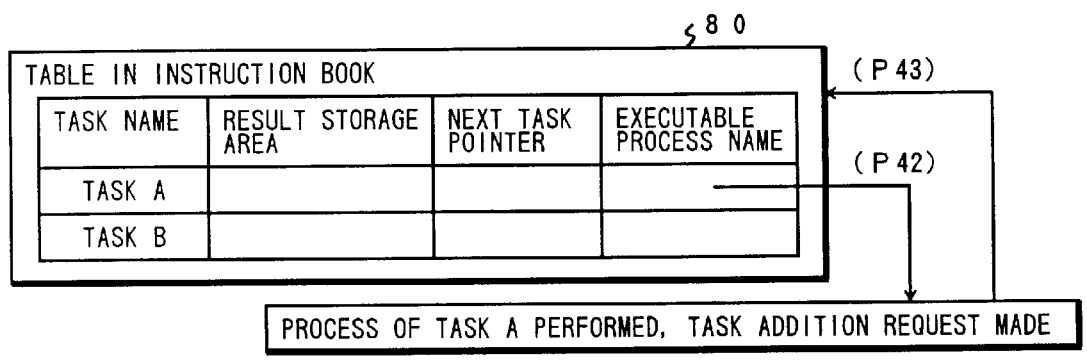
FIGS. 9B and 9C are diagrams depicting the state of a table in the instruction book corresponding to the process depicted in FIG. 9A.
Figure 9C:
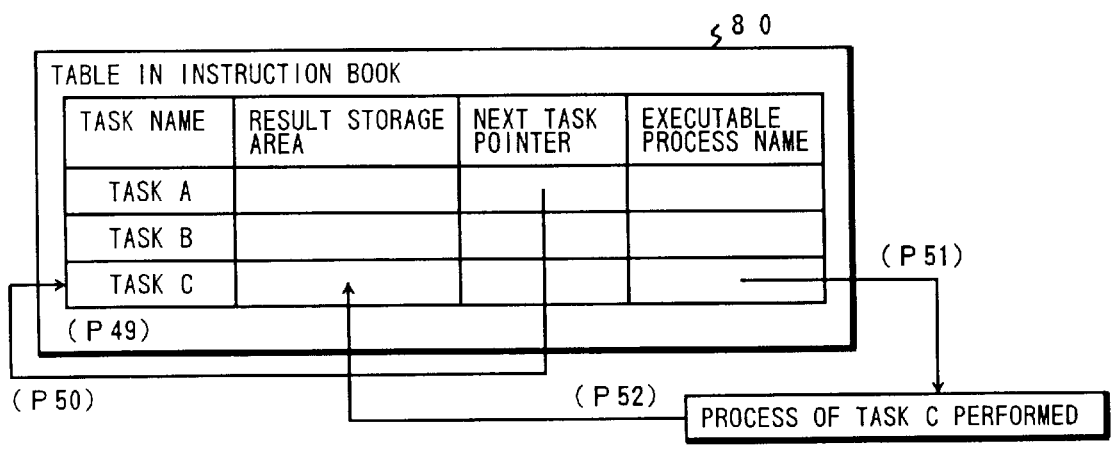

FIGS. 9A, 9B and 9C are diagrams depicting process flow in the case when a processing procedure is added in a preferred embodiment of the present invention.

The process flow in the case when a new object and processing procedure are added by the processing procedure in the instruction book 8 will be explained with reference to (P41) through (P52) in FIG. 9A.

A message is transmitted to a repository on the basis of processing procedure A in the instruction book 8 (P41). The repository passes the message to a designated object (P42). The object returns a processing result answer message to the processing procedure A of the instruction book 8 (P43).

If a new processing procedure C is added at this point, processing procedure A notifies the instruction book management unit 3 that a processing procedure has been added (P44). The instruction book management unit 3 notifies the instruction book procedure-adding unit 4 that a processing procedure has been added (P45).

The instruction book procedure-adding unit 4 notifies the instruction book management unit 3 that processing procedure C has been added (P46). Next, the instruction book management unit 3 requests the instruction book operation accumulation unit 6 to verify the operations of the added processing procedure C (P47).

The instruction book operation accumulation unit 6 verifies the operations of processing procedures A and C, and if the results of verification are correct, this fact is reported to the instruction book management unit 3 (P48). In this way, the instruction book management unit 3 adds processing procedure C to the instruction book 8 (P49).

Execution of processing procedure C transmits an object add/execute message to the repository (P50). The repository passes the message to the designated object (P51). The object returns registration notification and an answer message to the processing procedure A of the instruction book (P52).

FIGS. 9B and 9C are diagrams depicting the state of the table 80 in the instruction book corresponding to the process depicted in FIG. 9A. The processing procedure A and the processing procedure C in FIG. 9A correspond to task A and task C depicted in FIG. 9B and FIG. 9C, respectively.

In (P42) in FIG. 9B, a message is transmitted to the object which performs the processing of task A, and task A is executed. If a request to add task C occurs during execution of task A, task C is added and registered by the procedure of (P49), as in the instruction book table 80 depicted in FIG. 9C.

When processing is directed to the task C execute sequence by the next task pointer of task A, the task C process is executed from the task C executable program name in (P50) and (P51). When the task C process is completed, the processing results are stored in the instruction book table 80 in (P52).

Here, the example of adding task C was described, but besides tasks, search conditions and the like may be added. The addition may be permanent or temporary.

In this way, when new data is added to an instruction book during processing, the added data is written clearly in the instruction book, the necessary data is searched for on the basis of the clearly written data, and data padding is performed.

Furthermore, when a new processing procedure is added to an instruction book during processing, the added processing procedure is written clearly in the instruction book, the necessary data is searched for on the basis of the clearly written processing procedure, and a message is transmitted to the program (object) so that processing can proceed.

Figure 10:
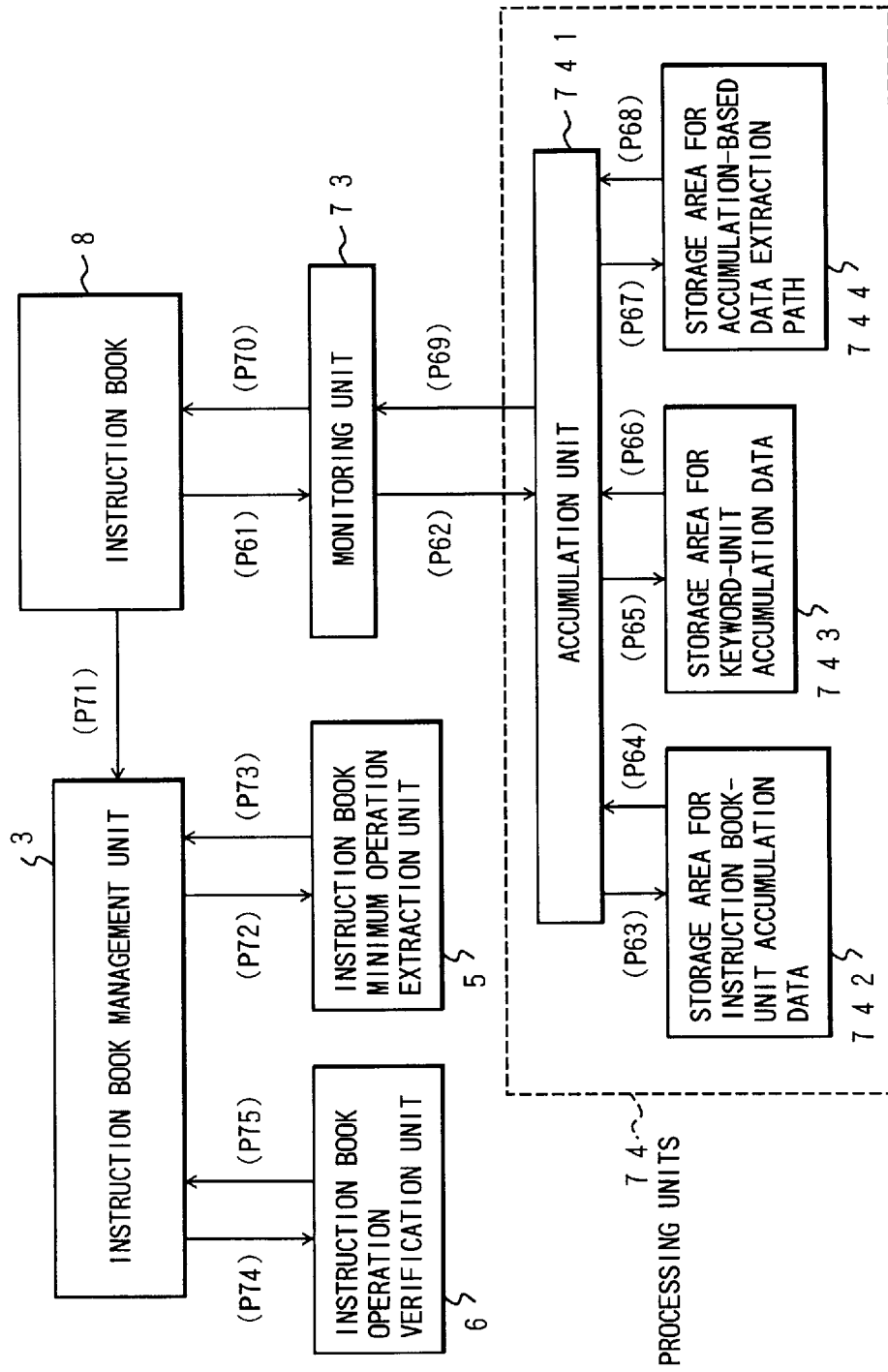
FIG. 10 is a diagram depicting process flow in the case of processing on the basis of accumulation data of processing procedures in a preferred embodiment.

FIG. 10 is a diagram depicting process flow in the case of extracting pickup data with a high hit rate by accumulating the rate of use of keywords and the like which accompanies the behavior of the instruction book.

Here, a case in which the instruction book accumulation instruction data of the instruction book 8 has an accumulation trigger comprising an instruction which specifies accumulation in units of, for example, one month is described. The time monitoring unit in the instruction book monitors whether or not a specified time period has elapsed, and when a period specified as an occasion for accumulation, for example, one month has elapsed, the monitoring unit 73 is activated by an accumulation trigger (P61).

The monitoring unit 73 notifies the accumulation unit 741 in each processing unit 74 and starts the accumulation process (P62).

The accumulation unit 741 accesses the instruction book-unit accumulation data storage unit 742 (P63) and fetches the accumulation results (P64). The accumulation unit 741 also accesses the keyword-unit accumulation data storage unit 743 (P65) and fetches the accumulation results (P66, P67). The accumulation unit 741 also accesses the accumulation based-data extraction path storage unit 744 and fetches the results (P68).

The accumulation unit 741 passes the received accumulation results to the instruction book 8 via the monitoring unit 73 (P69, P70). The instruction book 8 passes the received accumulation results to the instruction book management unit 3 (P71).

The instruction book management unit 3 requests minimum operation extraction to the instruction book minimum operation extraction unit 5 (P72) and retrieves the processing results (P73). The instruction book 8 passes these results to the instruction book operation verification unit 6 (P74), whereupon the instruction book operation verification unit 6 verifies whether or not the operation sequence which constitutes the processing results functions correctly (P75).

In this case, data can be collected on the basis of data obtained by accumulation of data given to the instruction book 8, and file management can be performed by an instruction book which has data classification as its object.

The time monitoring unit provided to the instruction book makes it possible to collect and classify various sorts of data over a certain fixed time period on the basis of the time period stipulated in the instruction book.

The instruction book is also provided with trigger data for starting data accumulation; the instruction book itself specifies trigger data. Data can be collected and classified on the basis of data obtained in time when trigger data is generated.

By adding data for tasks other than those targeted to the instruction book 8, the data for tasks other than those targeted can be retrieved in the foregoing configuration.

A plurality of instruction books having the same object can also be used.

Figure 11:
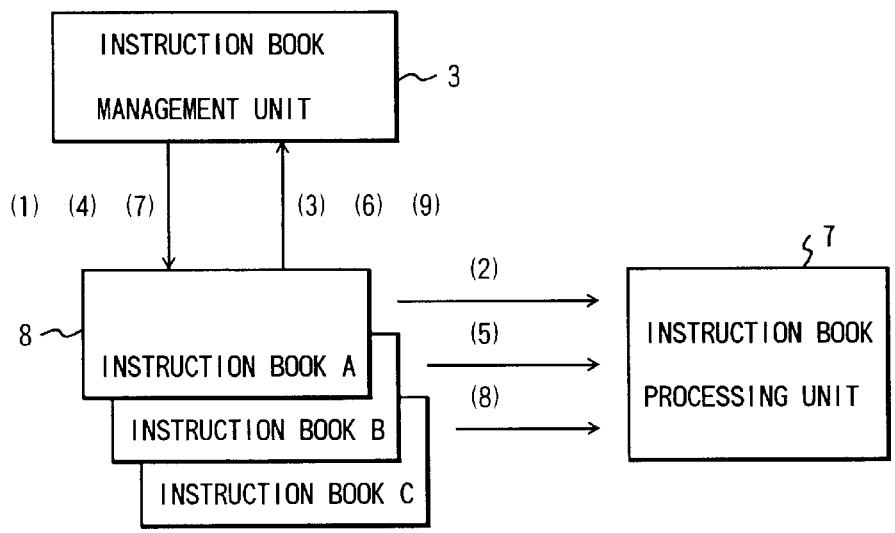
FIG. 11 is a diagram depicting process in the case of a plurality of instruction books.

FIG. 11 is a diagram depicting an example of the use of a plurality of instruction books 8 having the same object. A plurality of instruction books 8 may be present. As shown in FIG. 11, the instruction book management unit 3 assigns the instruction books A, B, and C priority and inter-instruction book linking data to ensure parallel processing. Thus, processing can be performed according to instruction book priority even when the processors used for processing overlap.

For example, as indicated in FIG. 11, processes (1) through (3) in instruction book A, processes (4) through (6) in instruction book B, and processes (7) through (9) in instruction book C are executed according to this priority sequence. In the case of parallel processing, these processes are executed in parallel by a plurality of processors.

In this way, assigning a priority sequence to instruction book processing allows for retrieval of desired data by a plurality of instruction books in accordance with the degree of urgency.

Figure 12:
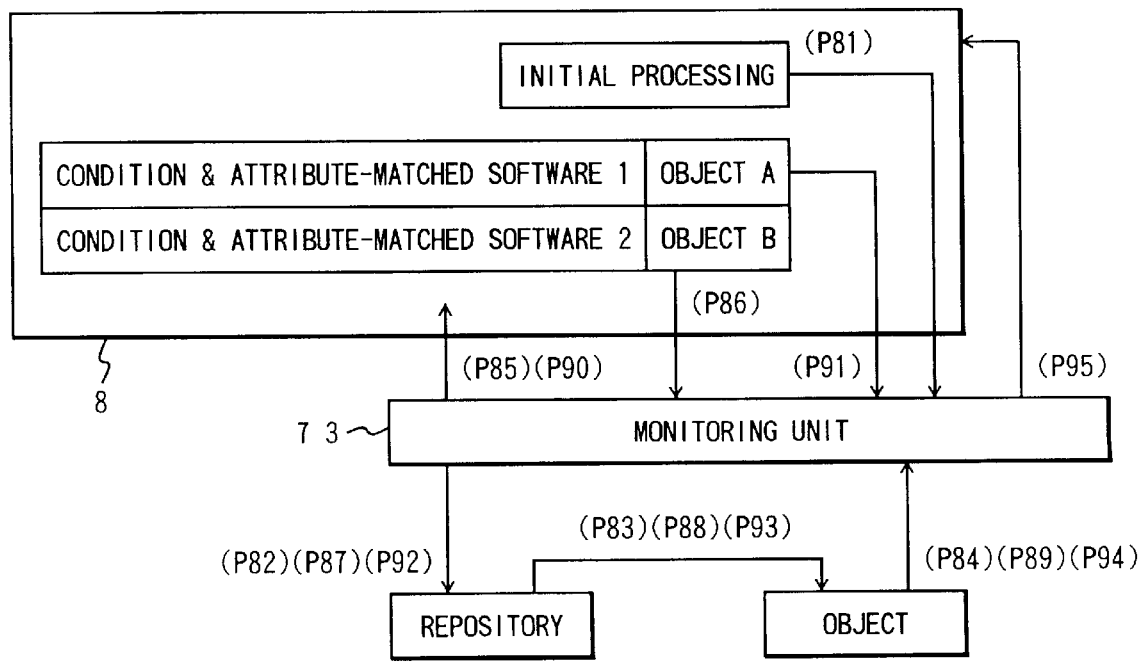
FIG. 12 is a diagram depicting an example of selecting and executing a process which is conditional with regard to processing results.

FIG. 12 is a diagram depicting an example of selecting and executing a process which meets conditions with regard to processing results.

As shown in FIG. 12, condition data for selecting and executing a process which meets conditions with regard to processing results is defined in the instruction book 8. Processes (P81) through (P95), depicted in FIG. 12, are executed in the following way.

The first process is transmitted through the monitoring unit 73 (P81) to a repository (P82). The repository transmits a message to the object (P83). The process is executed by the appropriate object (P84). The processing results are returned to the instruction book 8 (P85).

The instruction book 8 selects a process that meets the required conditions and attributes (for example, software program 2) on the basis of the processing results, and makes a request for processing, via the monitoring unit 73, to the object B (P86). This request is transmitted to the object through the repository and is executed (P87, P88). The processing results are returned to the instruction book 8 (P89, P90).

In similar fashion, the instruction book 8 selects a process that meets the required conditions and attributes (for example, software program 1) on the basis of the processing results, and makes a request for processing, via the monitoring unit 73, to the object A. The final processing results are then written to the instruction book 8.

FIG. 13 is a diagram depicting multimedia-adapted processing by instruction book 8 in a preferred embodiment.

As shown in FIG. 13, the instruction book 8 defines processing procedures which have motion video or static image data and the like, processing procedures which entail calls to audio programs, and the like. The instruction book processing unit 7a has a process storage unit 75, and the instruction book processing unit 7b has a data fetch storage unit 76. The data process storage unit 75 performs processing requests to a motion video-equipped repository, and stores the results of processing executed by a motion video-equipped object. The data fetch storage unit 76 performs processing requests to an audio-equipped repository, and stores the results of processing executed by an audio-equipped object.

In this way, objects with audio data and objects with motion video data can be used. Thus, the instruction book 8 can be adapted for multimedia.

Thus, the inclusion of audio, motion video, static image, and other types of data in instruction book-stipulated areas allows search conditions and search contents to be verified through audio, motion video, or static images.

Figure 14A:
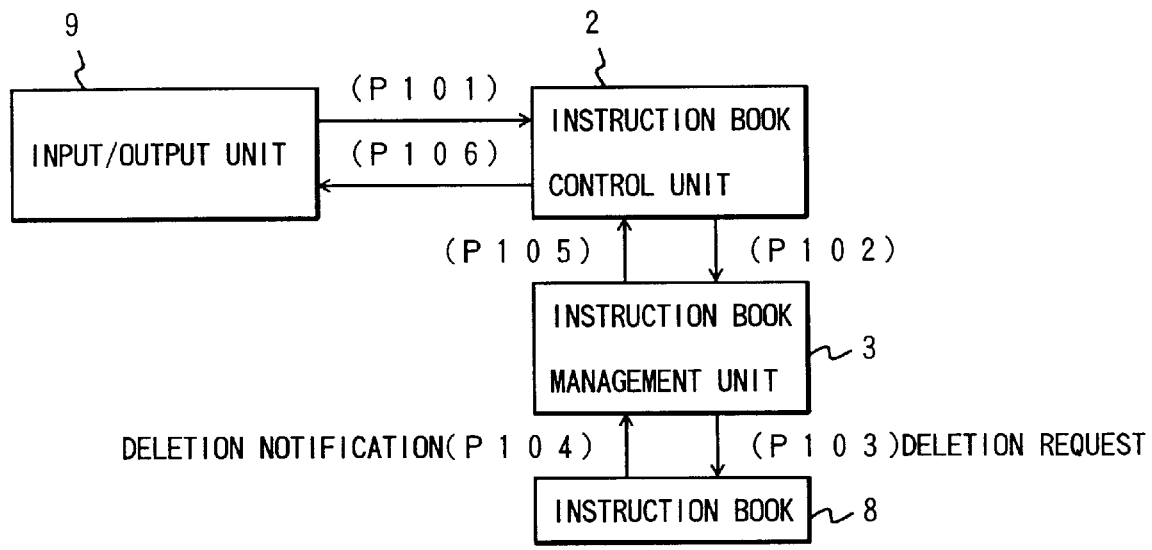
FIG. 14A is an example of performing instruction book deletion by input from the input/output unit.
Figure 14B:
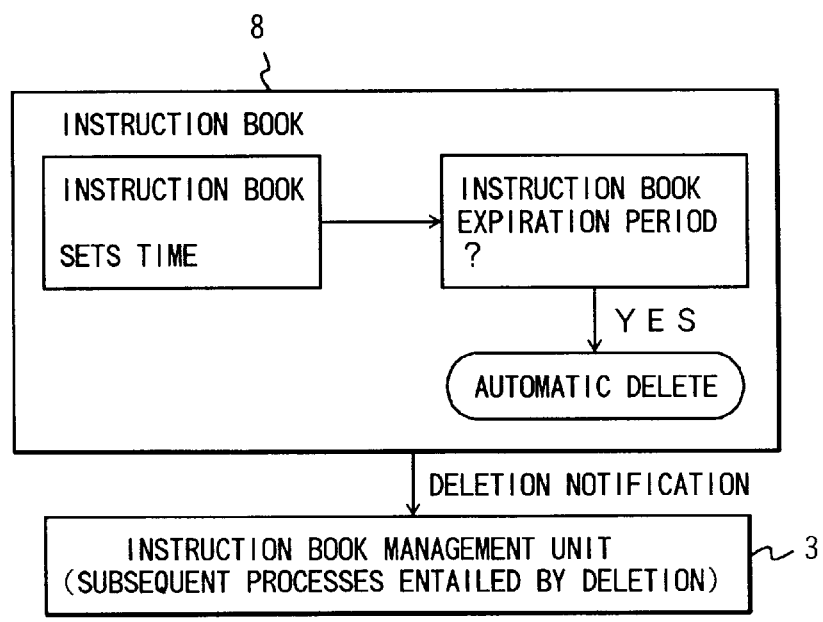
FIG. 14B depicts an example of autonomous deletion of an instruction book by means of a designated time for instruction book deletion which is defined in the instruction book.

FIGS. 14A and 14B are examples of a deletion process performed for the instruction book 8 in a preferred embodiment. FIG. 14A is an example of deletion performed by input from the input/output unit 9.

First, when a delete instruction for the instruction book 8 has been entered from the input/output unit 9 (P101), the instruction book control unit 2 transmits the request to the instruction book management unit 3 (P102).

The instruction book management unit 3 makes a delete request to the instruction book 8 (P103), and the instruction book 8 returns a delete notification to the instruction book management unit 3 (P104). The instruction book management unit 3 transmits this notification to the instruction book control unit 2 (P105).

Upon the delete notification from the instruction book management unit 3, the instruction book control unit 2 outputs a message indicating deletion of the instruction book 8 to the input/output unit 9 (P106).

FIG. 14B depicts an example of autonomous deletion of an instruction book 8 by means of a designated time for instruction book deletion, which is defined in the instruction book 8.

Instruction book deletion conditions are defined in the instruction book 8 when the instruction book 8 is created.

For example, when a delete time is set as the deletion condition in the instruction book 8, the instruction book 8 monitors the delete time that has been defined in the instruction book 8 using a timer. When the time counted by the timer coincides with the delete time, the instruction book 8 issues a delete notification to the instruction book management unit 3 and deletes automatically. The instruction book management unit 3 performs subsequent processing entailed by the deletion and the like. Besides a delete time, a keyword for deletion, a deletion-stipulating process, a deletion-stipulating execution count, or other occasion for deletion may be defined.

In this way, an instruction book can be deleted by a delete instruction from the user, or by delete instruction data, including a stipulated date and time or stipulated count stipulated in the instruction book 8.

Figure 15:
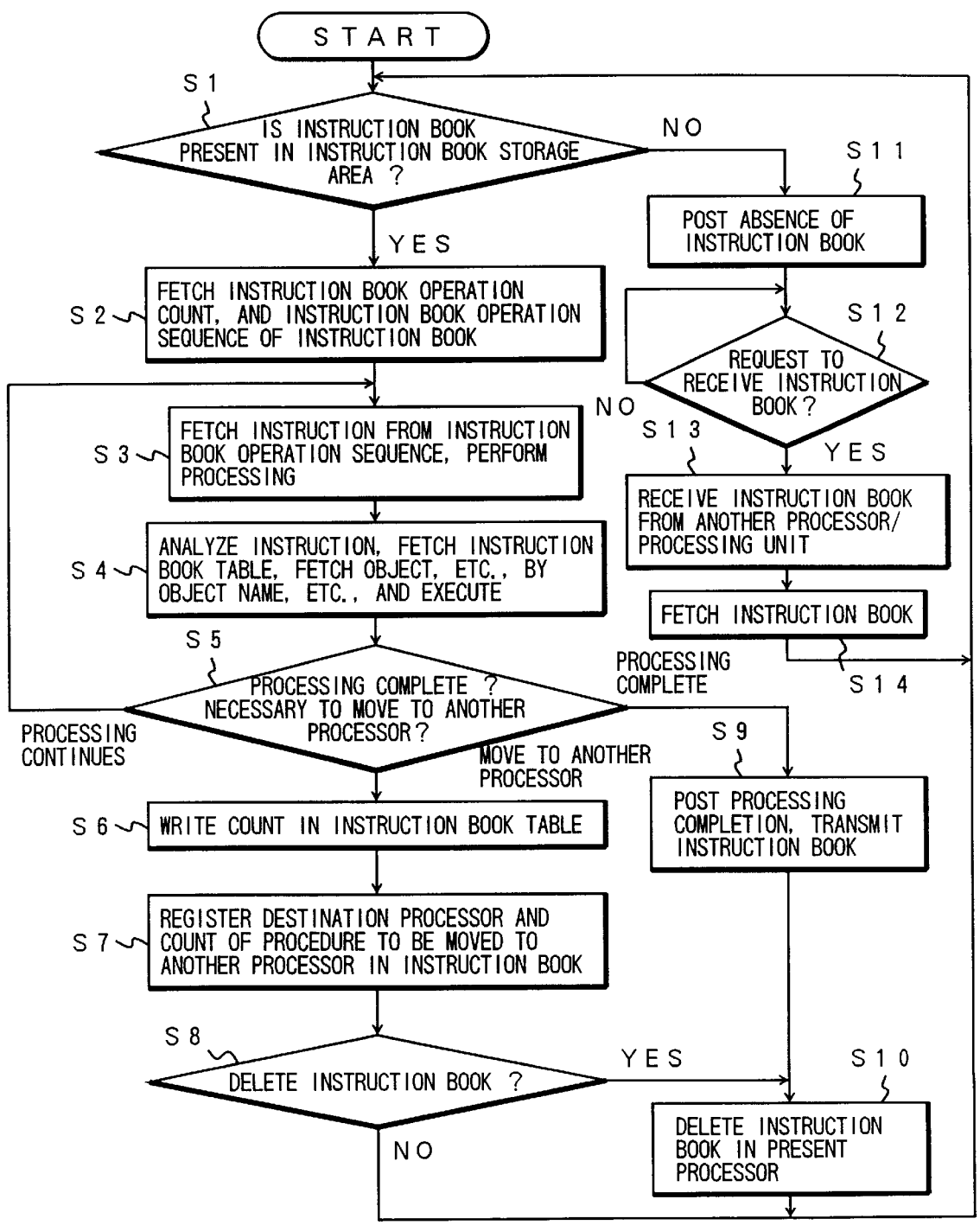
FIG. 15 is a process flow chart for the monitoring unit in a preferred embodiment.

FIG. 15 is a process flow chart for the monitoring unit 73 in a preferred embodiment.

In FIG. 15, in step S1, the monitoring unit 73 determines whether an instruction book 8 is present in its own instruction book storage area 72. If an instruction book 8 is present, the system proceeds to the process of step S2; if an instruction book 8 is absent, it proceeds to the process of step S11.

In step S2, the monitoring unit 73 fetches the instruction book operation count 82 and the instruction book operation sequence 81 in the instruction book 8. In step S3, the monitoring unit 73 fetches an instruction from the instruction book operation sequence 81 and performs the subsequent processes in sequence. In step S4, the monitoring unit 73 analyzes the instruction fetched in step S3, accesses a repository or the like by using the object name or the like, fetches the object or the like, and executes it.

In step S5, the monitoring unit 73 determines whether processing has been completed, or whether it is necessary to move to another processor during the executed task. If the processing has been completed, the system proceeds to step S9. If it is necessary to move the processing to another processor or to the instruction book management unit 3, it proceeds to step S6. If processing is to continue unchanged, it returns to step S3 and repeats the same process in accordance with the next instruction book operation sequence 81.

If processing is to be moved to another processor or to the instruction book management unit 3, in step S6 the monitoring unit 73 stores the instruction book operation count 82 in the table 80 in the instruction book. In the next step S7, the monitoring unit 73 registers the destination processor and the count of the procedure to be moved to another processor in the instruction book 8.

In step S8, the monitoring unit 73 decides from the contents of the instruction book 8 whether to delete the instruction book or leave it in the processor. If the instruction book is left, the system returns to step S1 and the process of the next instruction book 8 is performed. If the instruction book is deleted, processing proceeds to the process of step S10.

When processing has been completed in step S9, completion of the processing is notified to the instruction book management unit 3, and the instruction book 8 is sent to the instruction book control unit 2. In step S10, the instruction book 8 in the instruction book storage area 72 is deleted, the process returns to step S1, and processing proceeds to the process of the next instruction book 8.

If no instruction book 8 is present in the instruction book storage area 72, in step S11 the monitoring unit 73 notifies the instruction book management unit 3 that no instruction book 8 is present, and awaits the arrival of a new instruction book 8. In step S12, the monitoring unit 73 determines whether there has been a request from the instruction book management unit 3 to receive an instruction book 8. If there is a request, the system proceeds to step S13.

In step S13, the transmission unit 71 receives an instruction book 8 from another processor or from the instruction book management unit 3. In step S14, the instruction book 8 is placed in the instruction book storage area 72. The system then returns to step S1, and the processes in the received instruction book 8 are performed.

Figure 16:
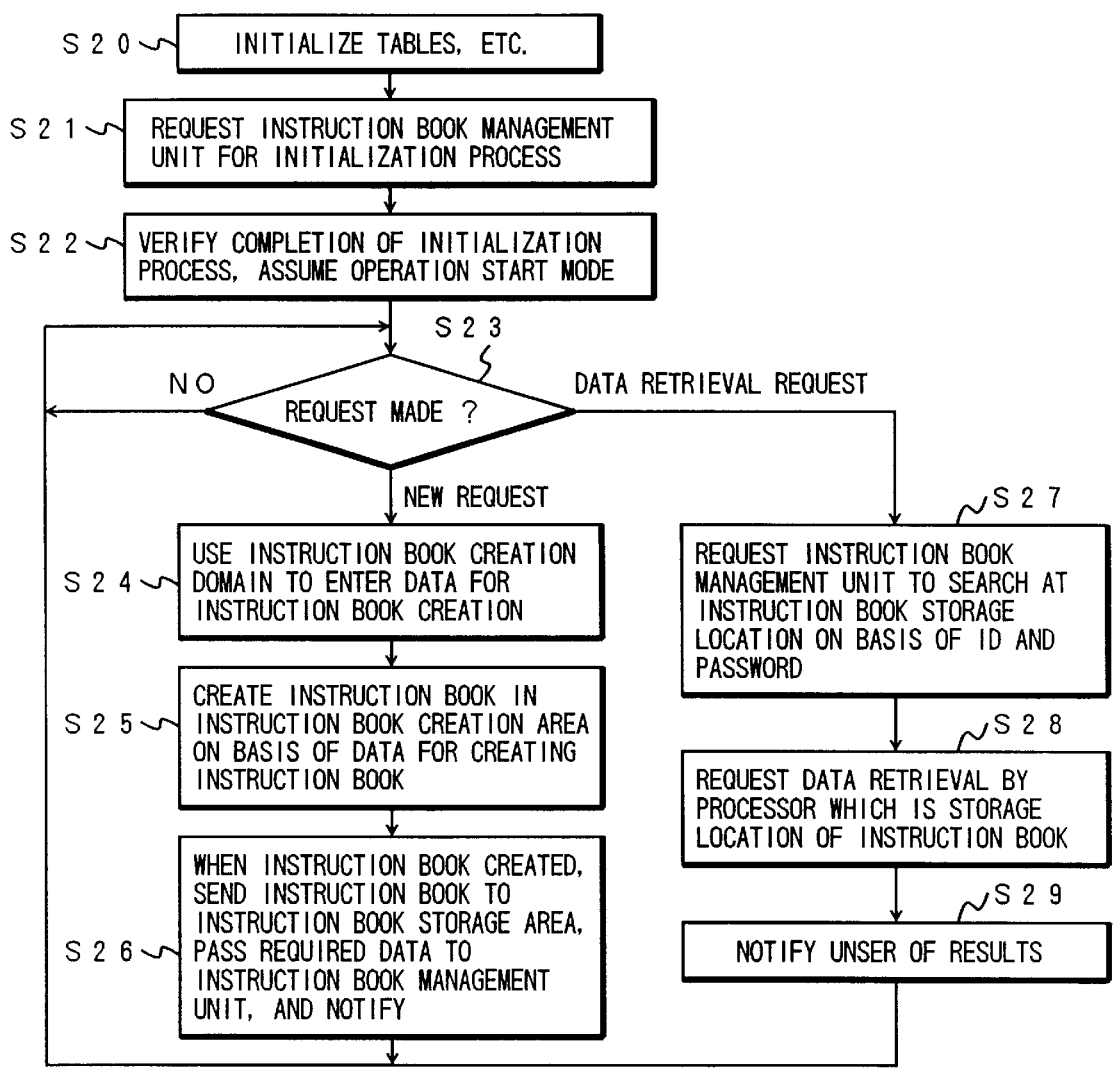
FIG. 16 is a process flow chart for the instruction book control unit in a preferred embodiment.

FIG. 16 is a process flow chart for the instruction book control unit 2 in a preferred embodiment. In FIG. 16, in step S20, the tables of the instruction book control unit 2 are initialized at the start of processing. In step S21, the instruction book management unit 3 is requested to perform an initialization process on the instruction book management data table 32. In step S22, completion of the initialization process is verified and the instruction book control unit 2 is placed in operation start mode.

In step S23, the instruction book control unit 2 waits for a request from the user, and if an entry is made from the input/output unit 9, it determines whether there has been a new request or a data retrieval request from the user. If there is a new request from the user, the system proceeds to step S24, if there is a data retrieval request by an existing instruction book 8, the system proceeds to step S27.

In the event of a new request, in step S24 the instruction book control unit 2 uses the instruction book creation domain area 22 to input data for creating an instruction book 8. In step S25, the instruction book control unit 2 creates an instruction book 8 in an instruction book creation area 23 on the basis of the data for creating the instruction book 8. In step S26, the instruction book control unit 2 sends the created instruction book 8 to an instruction book storage area 21 and notifies the instruction book management unit 3 of the required data. The system then returns to step S23 and awaits the next request.

If the request is a data retrieval request, in step S27 the instruction book control unit 2 requests the instruction book management unit 3 to perform a data search at a storage location of the instruction book 8 on the basis of the instruction book ID/password. If the instruction book ID and password are correct, in the following step S28 the instruction book control unit 2 requests data retrieval by the processor which is the storage location of the instruction book 8. In step S29, the instruction book control unit 2 notifies the user of the retrieved data through the input/output unit 9.

Figure 17:
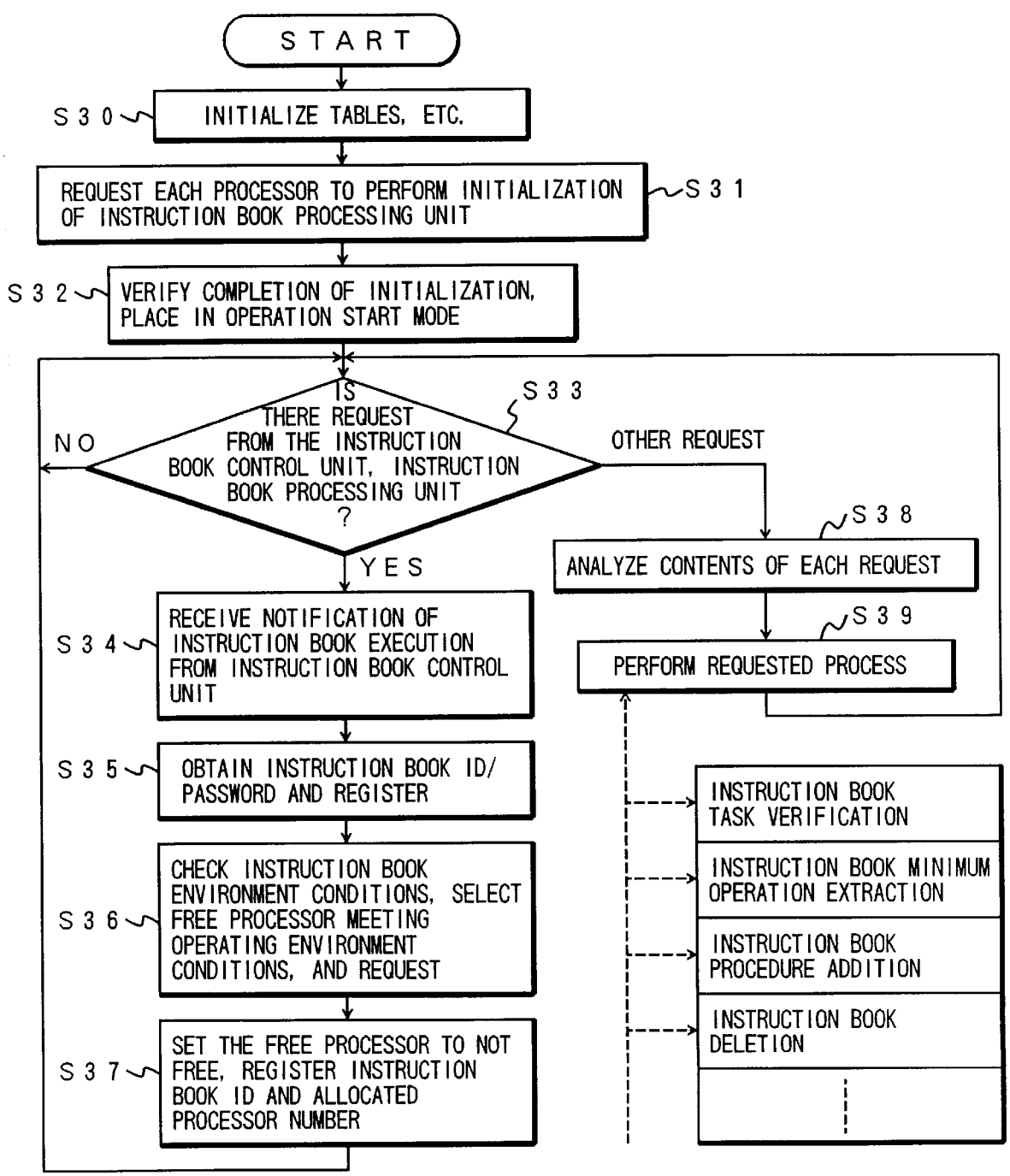
FIG. 17 is a process flow chart for the instruction book management unit in a preferred embodiment.

FIG. 17 is a process flow chart for the instruction book management unit 3 in a preferred embodiment. In FIG. 17, in step S30, the instruction book management unit 3 performs initialization of the instruction book management data table 32. In step S31, the instruction book management unit 3 requests each processor to perform an initialization process on the instruction book processing unit 7. In step S32, the instruction book management unit 3 verifies completion of the initialization process and places the system in operation start mode.

Subsequently, in step S33 the instruction book management unit 3 determines whether or not a request has been made from the instruction book control unit 2 and the instruction book processing unit 7. If a request has been made, the system proceeds to the process of step S34, and if there is another type of request, it proceeds to the process of step S38. If there is no request, the system awaits a request through the determination made in step S33.

If there is a request from the instruction book control unit 2 and the like, in step S34 the instruction book management unit 3 receives execution notification of instruction book 8 from the instruction book control unit 2. In step S35, the instruction book management unit 3 obtains the instruction book ID/password and registers it in the instruction book management data table 32.

In step S36, the instruction book management unit 3 checks the environment conditions of the instruction book 8, selects a free processor that meets the operating environment conditions, and requests processing to the selected processor. In step S37, the instruction book management unit 3 sets the free processor to "not free (busy)" in the instruction book management data table 32 and registers the instruction book ID and the allocated processor number. The system then returns to step S33 and moves to the process of the next request.

In the case of other types of requests, in step S38 the instruction book management unit 3 analyzes the contents of each request. Other types of requests include, for example, requests to the instruction book operation verification unit 6 for instruction book operation verification, requests to the instruction book minimum operation extraction unit 5 for instruction book minimum operation extraction, requests to the instruction book procedure-adding unit 4 for instruction book procedure addition, and instruction book delete requests. In step S39, the instruction book management unit 3 performs the requested process. The system then returns to step S33 and moves to the process of the next request.

Figure 18:
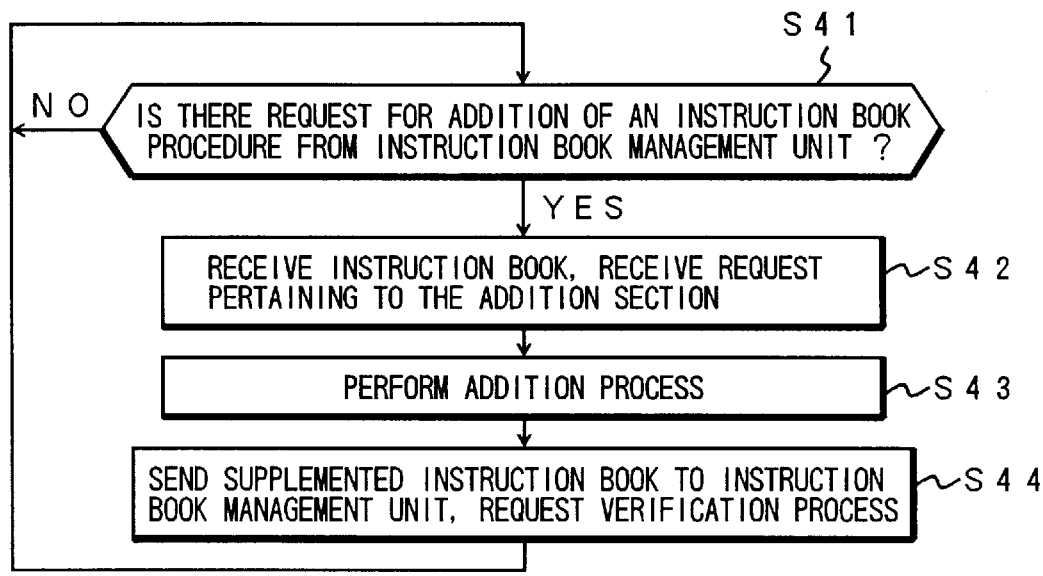
FIG. 18 is a process flow chart for the instruction book procedure-adding unit in a preferred embodiment.

FIG. 18 is a process flow chart for the instruction book procedure-adding unit 4 in a preferred embodiment. In FIG. 18, in step S41 the instruction book procedure-adding unit 4 waits until there is a request for addition of an instruction book procedure from the instruction book management unit 3.

If there is a request, in step S42 the instruction book procedure-adding unit 4 receives the instruction book 8 and receives the request pertaining to the addition section. In step S43, the instruction book procedure-adding unit 4 performs addition process of the procedure at the addition section. In step S44, the instruction book procedure-adding unit 4 sends the added instruction book 8 to the instruction book management unit 3 and requests instruction book operation verification. The system then returns to step S41.

Figure 19:
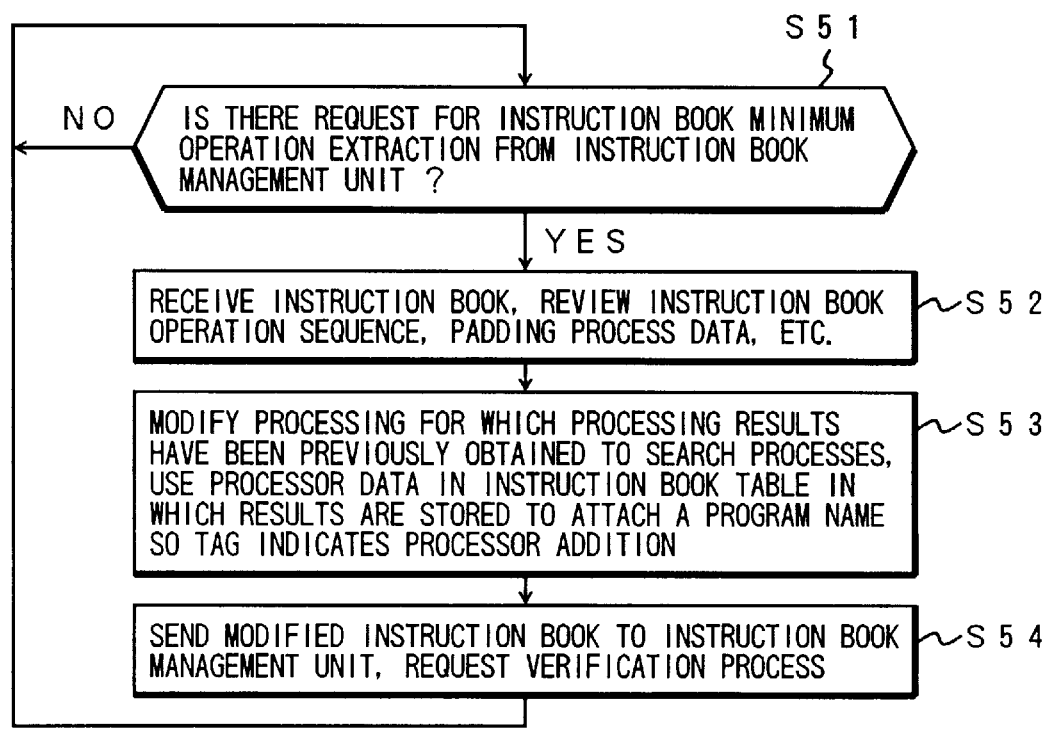
FIG. 19 is a process flow chart for the instruction book minimum operation extraction unit in a preferred embodiment.

FIG. 19 is a process flow chart for the instruction book minimum operation extraction unit in a preferred embodiment. In FIG. 19, in step S51 the instruction book minimum operation extraction unit 5 waits for a request for instruction book minimum operation extraction from the instruction book management unit 3.

If there is a request, in step S52 the instruction book minimum operation extraction unit 5 receives the instruction book 8 and reviews the instruction book operation sequence 81, the padding process data 83, and the like. In step S53, tasks on sections in which processing results are already stored are modified to search processes. In addition, processor data in the instruction book table 80 in which processing results are stored is used to attach a program(object) name; a tag in the table indicates processor addition. In step S54, the instruction book minimum operation extraction unit 5 sends the modified instruction book 8 to the instruction book management unit 3 and requests instruction book operation verification. The system then returns to step S51.

Figure 20:
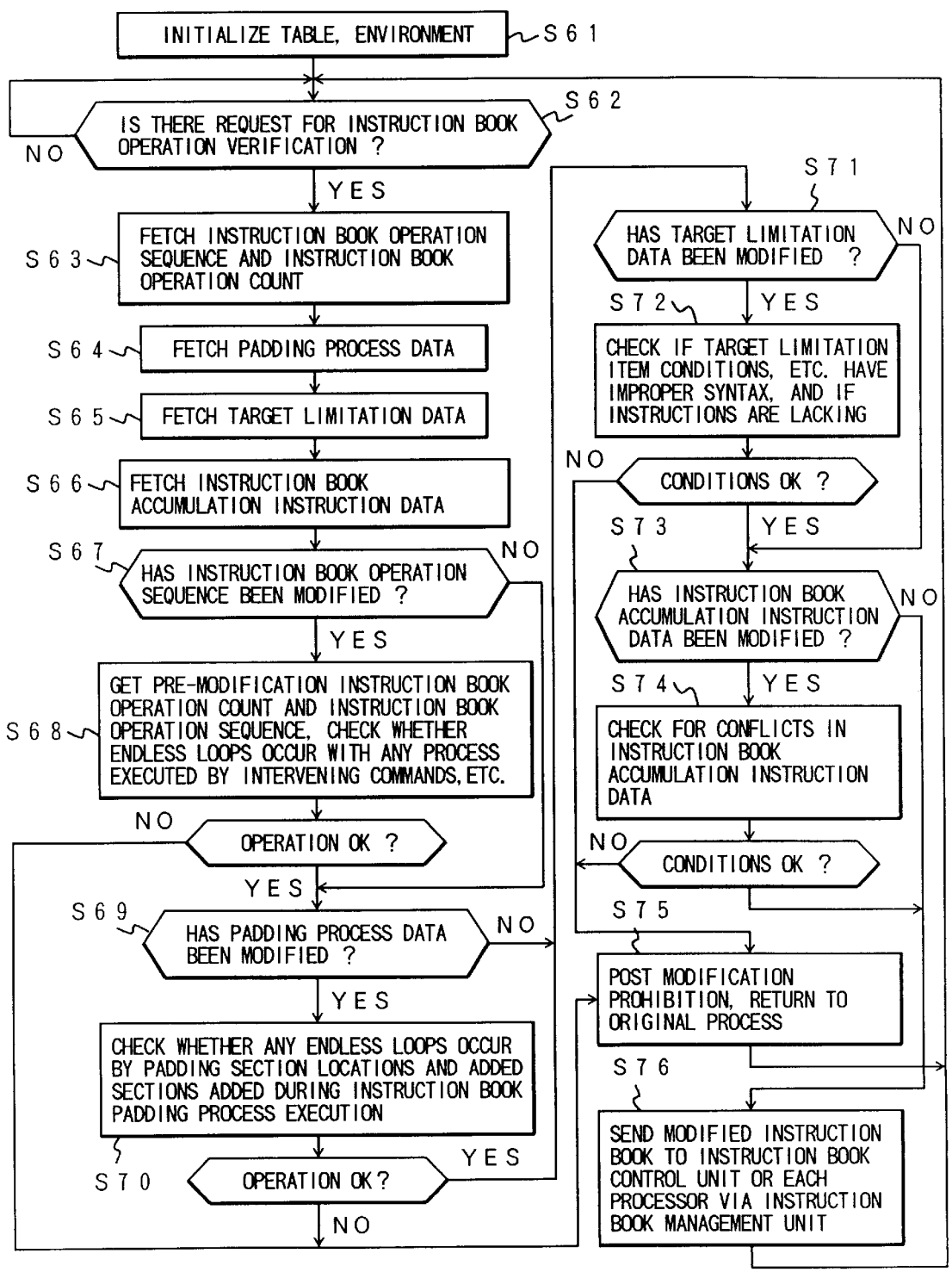
FIG. 20 is a process flow chart for the operation verification unit in a preferred embodiment.

FIG. 20 is a process flow chart for the operation verification unit in a preferred embodiment. In FIG. 20, in step S61 the instruction book operation verification unit 6 performs initialization of the operation verification table 60 and initialization of the environment. In step S62, the instruction book operation verification unit 6 determines whether there has been a request for instruction book operation verification from the instruction book management unit 3. If there is a request for operation verification, the process of step S63 is performed. If there is no request, the system repeats the process of step S62.

In step S63, the instruction book operation verification unit 6 fetches the instruction book operation sequence .81 and the instruction book operation count 82 of the instruction book 8. In step S64, the instruction book operation verification unit 6 fetches the padding process data 83 of the instruction book 8, and in step S65 it fetches the target limitation data 84 of the instruction book 8.

In step S66, the instruction book operation verification unit 6 fetches the instruction book accumulation instruction data 86 of the instruction book 8, and in step S67 it determines whether the instruction book operation sequence 81 of the instruction book 8 has been modified. If the instruction book operation sequence 81 has been modified, the process of step S68 is performed, if the instruction book operation sequence 81 has not been modified, the system proceeds to the process of step S69.

In step S68, the instruction book operation verification unit 6 obtains the pre-modification instruction book operation count 82 and instruction book operation sequence 81, and refers to the value of the instruction book operation count 82 to check whether any endless loops that are not associated with any process executed by an intervening command or the like have occurred. If the verification results are normal, the system proceeds to step S69. If the verification results are abnormal, the system proceeds to step S75.

In step S69, the instruction book operation verification unit 6 determines whether the padding process data 83 of the instruction book 8 has been modified. If the padding process data 83 has been modified, the process of step S70 is performed, and if the padding process data 83 has not been modified, the system proceeds to the process of step S71.

In step S70, the instruction book operation verification unit 6 checks whether any endless loops have been occurred by padding section locations and added sections added during instruction book 8 padding process execution. If the verification results are normal, the system proceeds to step S71. If the verification results are abnormal, the system proceeds to process of step S75.

In step S71, the instruction book operation verification unit 6 determines whether the target limitation data 84 of the instruction book 8 has been modified. If the target limitation data 84 has been modified, the process of step S72 is performed, while if the imitation data 84 has not been modified, the system proceeds to the process of step S73.

In step S72, the instruction book operation verification unit 6 checks whether conditions for activating target limitation items have improper syntax, whether any instructions are lacking, and the like. If the verification results reveal no problems, the process of step S73 is performed, while if the verification results reveal problems, the system proceeds to the process of step S75.

In step S73, the instruction book operation verification unit 6 determines whether the instruction book accumulation instruction data 86 has been modified. If the instruction book accumulation instruction data 86 has been modified, the process of step S74 is performed, while if the instruction book accumulation instruction data 86 has not been modified, the system proceeds to the process of step S76.

In step S74, the instruction book operation verification unit 6 checks to determine if there are any conflicts in the sections added to the instruction book accumulation instruction data 86. If there are no conflicts in the added section, the process of step S75 is performed, while if there are conflicts in the added section, the system proceeds to the process of step S76.

In step S75, the instruction book operation verification unit 6 reports that an optimization error or the like has been produced by addition of a procedure or by instruction book minimum operation extraction and prohibits modification, so that modification operations are interrupted and the system returns to the original process.

If the results of instruction book operation verification indicate that all processes are normal, in step S76 the instruction book operation verification unit 6 sends the modified instruction book 8 to the instruction book control unit 2 and to each processor via the instruction book management unit 3.

The foregoing process allows processing to be performed by circulating a plurality of instruction books 8 around a system which has been connected in a network or the like. The user contacts an instruction book 8 through the instruction book control unit 2. In this way, required data can be retrieved and required data can be searched in flexible manner.

The instruction book which pertains to this preferred embodiment has the following characteristics. First, data obtained from processed data can be stored in instruction books. New programs and the like obtained from instruction books can be stored in the instruction book.

In addition, non-target task data can be added to instruction books, and data can be retrieved with target data as a condition. Non-target applications can be executed, limited processes can be executed with feedback, and the instruction book can be padded with the communicated data.

Furthermore, the behavior of an instruction book itself can be limited by providing a functional unit for monitoring the operation of the instruction book and performing instructions or the like with reference to the operation of this functional unit. Sections in which instruction book functions and application functions agree, agreeing data in limiting sections, and the like allow instruction book behavior to be modified as desired.

Utilizing added data and histories of activities performed by instruction books, it is possible to optimize data acquisition by new instruction books. Instruction books can be used continuously for retrieval and management of data and the like through search instructions and the like through semi-permanent processes and instruction books.

As described above, in this preferred embodiment it is possible to render the processing side and user interface side independent through the medium of the instruction book. It is thus possible to effectively employ objects and the like which are distributed through different environments.

The instruction book executes user-defined tasks and advances processing, and adapts to emergencies or randomly occurring data and conditions, thus allowing the instruction book to modify processing procedures autonomously.

It therefore becomes unnecessary to constantly monitor changes in the environment. Thus, effective task process execution is possible in frequently-changing environments, such as distributed networks, multiprocessor or multitasking systems, distributed object-oriented systems, coordinated networks, and the like.

What is claimed is:

1. An autonomous distributed instruction book control device in a system having a plurality of processors, in which an instruction book is transmitted from one of the plurality of processors to another, said instruction book containing a definition for a processing procedure by which a processor receiving the instruction book processes data stored in the receiving processor, each processor comprising:

an input unit to input a creation request of the instruction book and a processing request corresponding to the instruction book;

an instruction book creating unit to create the instruction book from the creation request;

a selecting unit to select a processor, from the plurality of processors, which meets an environment condition of the instruction book which is created by the instruction creating unit or which corresponds to the processing request;

a first transmitting unit to transmit the created instruction book to the selected processor;

a processing unit to execute a process in accordance with the definition for the processing procedure contained in the instruction book received from the first transmitting unit of another processor, said processing unit updating the processing procedure contained in the received instruction book; and a second transmitting unit to transmit the updated instruction book to another processor selected by the selecting unit.

2. An autonomous distributed instruction book control device as defined in claim 1, wherein said processing unit comprises:

a plurality of processing units, each of the plurality of processing units executing an individual process; and a monitoring unit to monitor the instruction book and activate one of the plurality of processing units by sending messages to an object or program which executes a process based on the definition for the processing procedure contained in the instruction book.

3. An autonomous distributed instruction book control device as defined in claim 1, further comprising:

an instruction book procedure-adding unit to add a new processing procedure to the instruction book.

4. An autonomous distributed instruction book control device as defined in claim 1, wherein the instruction book is provided with an area for padding processes, which stores a task name updated in response to processing and environment, a task result, and names of executable programs for executing tasks, and said processing unit refers to the area for the padding processes in an updated instruction book to determine which of the processes of the executing tasks is to be executed next.

5. An autonomous distributed instruction book control device as defined in claim 1, further comprising:

an instruction book minimum operation extraction unit to extract a minimum search route for retrieving data stipulated by the instruction book and to reconfigure the processing procedure to retrieve the data so as to be executed with minimum operation, in accordance with the extracted minimum search route.

6. An autonomous distributed instruction book control device as defined in claim 3, further comprising:

an instruction book operation verification unit to verify in advance a validity of operation pertaining to the new processing procedure added to the instruction book by said instruction book procedure-adding unit.

7. An autonomous distributed instruction book control device as defined in claim 5, further comprising:

an instruction book operation verification unit to verify in advance a validity of operation pertaining to the reconfigured processing procedure when the processing procedure has been reconfigured by said instruction book minimum operation extraction unit.

8. An autonomous distributed instruction book control device as defined in claim 1, wherein the instruction book has an area for storing an instruction book deletion condition which relies on at least one from among delete period, number of executions, and keywords, and is automatically deleted when the instruction book deletion condition stored in the instruction book is met.

9. An autonomous distributed instruction book control device as defined in claim 1, wherein the instruction book has an area for storing accumulation instruction data, including accumulation triggers for accumulating predetermined data and data pertaining to accumulation programs, and said processing unit comprises an accumulation unit to use an accumulation trigger for running an appropriate accumulation program.

10. An autonomous distributed instruction book control device in a system having a plurality of processors, each of the plurality of instruction books having a corresponding processing procedure, each of the plurality of processors comprising:

an instruction book creating unit to create a new instruction book having a corresponding processing procedure according to which a processor receiving the new instruction book processes data stored in the receiving processor;

a selecting unit to select, based on the new instruction book, a processor from the plurality of processors to execute the processing procedure of the new instruction book;

a transmitting unit to transmit the new instruction book to the selected processor; and a processing unit to process and update a processing procedure of a new instruction book received from the transmitting unit of another processor.

11. An autonomous distributed instruction book control device in a system having a plurality of processors, in which a plurality of instruction books are transmitted by a processing procedure according to which a processor receiving the instruction book processes data stored in the receiving processor, each of the plurality of processors comprising:

an instruction book creating device to create a new instruction book defining a corresponding processing procedure;

a selecting device to select a processor from the plurality of processors to process data according to the processing procedure defined by the new instruction book;

a transmitting device to transmit the new instruction book to the selected processor; and a processing device to process data according to a processing procedure of a new instruction book created by the instruction book creating device of another processor, update the processing procedure of the instruction book created by the other processor, and transmit the updated instruction book to another processor selected by the selecting device.

12. A method for transmitting an instruction book from one processor to another processor from among a plurality of processors in a system, the instruction book containing a definition of a processing procedure by which a processor receiving the instruction book processes data stored in the receiving processor, comprising the steps of:

creating the instruction book;

selecting a processor to execute processing according to the definition of the processing procedure contained in the created instruction book;

transmitting the created instruction book to the selected processor;

executing processing according to processing procedures of instruction books received from other processors;

updating a definition of the processing procedure contained in an instruction book received from another processor;

selecting a processor to execute processing according to the updated definition; and transmitting the instruction book containing the updated definition to the processor selected to execute processing according to the updated definition.

* * * * *